US008164673B2

(12) United States Patent
Horie

(10) Patent No.: US 8,164,673 B2
(45) Date of Patent: Apr. 24, 2012

(54) FILTER SWITCHING DEVICE, PHOTOGRAPHING LENS, AND CAMERA

(75) Inventor: Takuji Horie, Sagamihara (JP)

(73) Assignee: Olympus Corporation, Tokyo (JP)

(*) Notice: Subject to any disclaimer, the term of this patent is extended or adjusted under 35 U.S.C. 154(b) by 463 days.

(21) Appl. No.: 12/406,521

(22) Filed: Mar. 18, 2009

(65) Prior Publication Data
US 2009/0244355 A1 Oct. 1, 2009

(30) Foreign Application Priority Data

Mar. 27, 2008 (JP) ................... 2008-84503
Oct. 29, 2008 (JP) ................. 2008-278099

(51) Int. Cl.
G02B 13/16 (2006.01)
H04N 5/225 (2006.01)
G03B 7/24 (2006.01)
(52) U.S. Cl. ....................... 348/335; 396/209
(58) Field of Classification Search .......... None
See application file for complete search history.

(56) References Cited

U.S. PATENT DOCUMENTS

| 3,868,714 A * | 2/1975 | Muryoi | 396/297 |
| 4,851,897 A * | 7/1989 | Inuma et al. | 348/224.1 |
| 4,967,281 A * | 10/1990 | Takada | 348/361 |
| 5,003,399 A * | 3/1991 | Ishimaru et al. | 348/361 |
| 6,452,732 B1 * | 9/2002 | Okada et al. | 359/813 |
| 6,930,723 B1 * | 8/2005 | Tsuda et al. | 348/363 |
| 7,715,115 B2 * | 5/2010 | Aiba | 359/723 |
| 7,929,041 B2 * | 4/2011 | Okabe | 348/340 |
| 2001/0030707 A1 * | 10/2001 | Fujii | 348/335 |
| 2008/0246856 A1 * | 10/2008 | Shibuya et al. | 348/223.1 |

FOREIGN PATENT DOCUMENTS

JP 2002-296114 9/2002

* cited by examiner

Primary Examiner — Justin P Misleh
(74) Attorney, Agent, or Firm — Volpe and Koenig, P.C.

(57) ABSTRACT

A filter switching device includes: an optical filter unit that is disposed on an optical path of an object light that passes through an image pickup lens of a camera, and can be switched to any one of a plurality of spectral transmission characteristics; a spectral transmission characteristic switching unit that switches a spectral transmission characteristic of the optical filter unit to one of the plurality of spectral transmission characteristics; a filter spectral transmission characteristic information storage unit that stores filter spectral transmission characteristic information, which is information relating to each of the plurality of spectral transmission characteristics; and a filter spectral transmission characteristic information output unit that outputs filter spectral transmission characteristic information corresponding to the spectral transmission characteristic of the optical filter unit to the camera when the spectral transmission characteristic of the optical filter unit is switched.

18 Claims, 21 Drawing Sheets

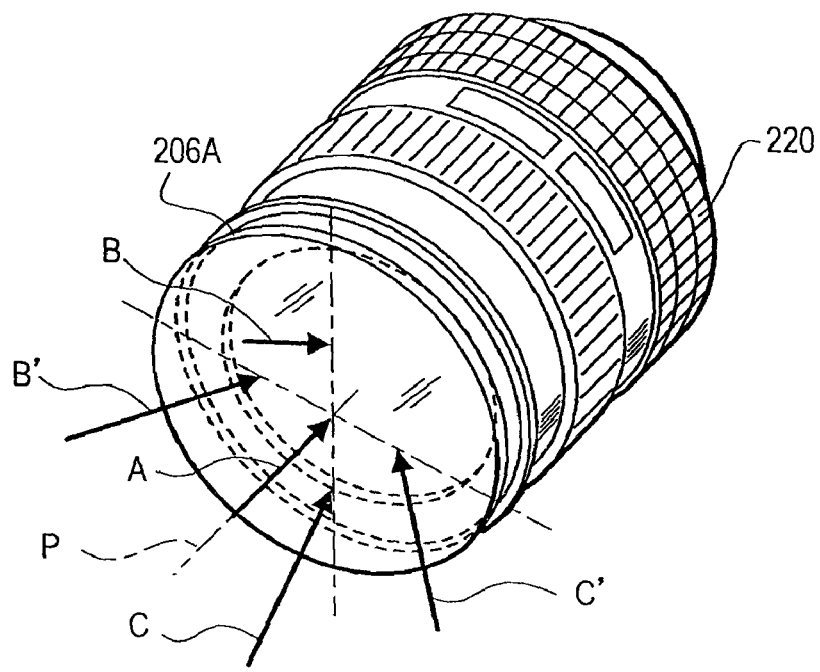
FIG. 10A
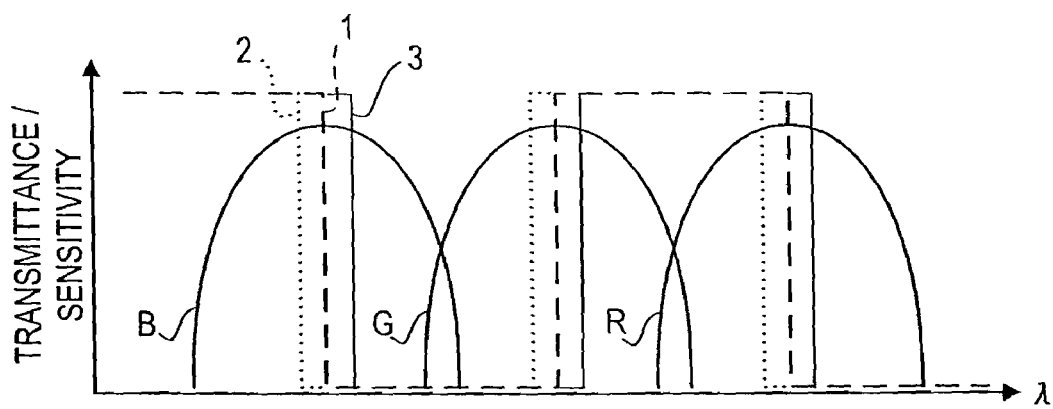
FIG. 10B
| T(1,1) | T(1,2) | ⋯ | ⋯ | ⋯ | ⋯ | 1000 |
| T(2,1) | T(2,2) | | | | | |
| ⋮ | | | | | | |
| | | | | | T(m,n) | |
FIG. 10C

FILTER SWITCHING DEVICE, PHOTOGRAPHING LENS, AND CAMERA

FIELD OF THE INVENTION

This invention relates to a filter switching device, a photographing lens, a camera, and an image pickup system that are suitable for use in generating an image having a larger number of bands than three.

DESCRIPTION OF THE RELATED ART

A technique for performing image pickup using a band pass filter having a larger number of bands than three has been developed as a method of reproducing colors more faithfully and naturally through multi-primary color image expression that is not constrained to the conventional three primary colors. In this specification, a larger number of bands than three will be referred to as "multiband", an image constituted by a larger number of primary colors than three will be referred to as a "multi-primary color image", an image constituted by a larger number of spectra than three will be referred to as a "multi-spectrum image", and so on.

JP2002-296114A discloses a technique for obtaining a multi-spectrum image. This technique uses color photosensitized film (hereafter, color photosensitized film will be referred to simply as "color film") including R, G, B photosensitized material that is sensitive to red (R), green (G) and blue (B) light, and two band pass filters. Here, the two band pass filters will be referred to as an "A filter" and a "B filter". The A filter and B filter respectively possess spectral transmittance (for convenience, it is assumed that the A filter has a spectral transmittance A and the B filter has a spectral transmittance B) according to which transmittances vary precipitously in relation to wavelength variation. For example, when the spectral transmittances of the A filter and the B filter are rendered on a spectral characteristic chart having wavelength on the abscissa and transmittance on the ordinate, characteristics respectively having a substantially rectangular waveform are obtained, as shown in FIGS. 12A and 12C. A spectral transmittances are then selected such that the respective phases of the A filter and B filter are reversed to each other, or in other words such that transmission band in the A filter is a non-transmission band in the B filter.

When the spectral sensitivity characteristic (B, G, R) of the color film is superposed onto the graph showing the spectral transmittance of the A filter or B filter, as shown in FIGS. 12A and 12C, the spectral transmittance A and the spectral transmittance B are set such that the spectral transmittances of the filter A and the filter B vary precipitously in wavelength positions where the respective B, G, R spectral sensitivity bands are divided.

Hence, when photographing is performed with the filter A attached, a spectral sensitivity characteristic obtained by combining the color film and the filter A has a comparatively narrow band (Ba, Ga, Ra), as shown in FIG. 12B. Similarly, when photographing is performed with the filter B attached, a spectral sensitivity characteristic obtained by combining the color film and the filter B has a comparatively narrow band (Bb, Gb, Rb), as shown in FIG. 12D.

An identical object is photographed with the filter A attached and then with the filter B attached. The two obtained photographed images (images formed on two pieces of the color film following development) are then read by a scanner, whereby density image signals for each pixel of the respective photographed images are obtained. During processing of the density image signals, the spectral transmittances of the filter A and filter B, a spectral sensitivity distribution of illumination light illuminating the object, and so on are taken into consideration, and thus a spectral reflectance image constituted by six bands can be obtained.

SUMMARY OF THE INVENTION

The technique described above does not disclose a method of associating the filter used during photographing with the image (image data) obtained as a result of the image pickup. In other words, the information of filters that were used during photographing must be recorded separately. Furthermore, when image data are processed subsequently, information relating to the spectral transmittances to be applied must be specified (input) in accordance with the respective image data, which is inefficient. Also, when an error occurs during recording of the used filter or input of the spectral transmittance information, the color reproducibility (faithfulness) of the obtained image data decreases greatly.

An object of this invention is to enable error-free image data processing without the need for a photographer to record a filter type every time the filter is exchanged during image pickup and input spectral transmittance information relating to the filter during the image data processing. Another object of this invention is to simplify an image pickup procedure so as to improve workability during image pickup operation.

A first aspect of this invention is applied to a filter switching device. The filter switching device is disposed on an optical path of an object light that passes through a photographing lens of a camera. The filter switching device includes: an optical filter unit that can be switched to any one of a plurality of spectral transmittances;

a spectral transmittance switching unit that switches a spectral transmittance of the optical filter unit to one of the plurality of spectral transmittances;

a filter spectral transmittance information storage unit that stores filter spectral transmittance information, which is information relating to each of the plurality of spectral transmittance; and a filter spectral transmittance information output unit that outputs filter spectral transmittance information corresponding to the spectral transmittance of the optical filter unit to the camera when the spectral transmittance of the optical filter unit is switched.

A second aspect of this invention is applied to photographing lens for a camera. The photographing lens for a camera includes: an optical filter unit that can be switched to any one of a plurality of spectral transmittance, the optical filter being disposed on an optical path of an object light that passes through the photographing lens;

a spectral transmittance switching unit that switches a spectral transmittance of the optical filter unit to one of the plurality of spectral transmittances;

a filter spectral transmittance information storage unit that stores filter spectral transmittance information, which is information relating to each of the plurality of spectral transmittances;

a lens spectral transmittance information storage unit that stores lens spectral transmittance information, which is information relating to a spectral transmittance of the photographing lens; and a lens information output unit that outputs lens information including the filter spectral transmittance information and the lens spectral transmittance information corresponding to the spectral transmittance of the optical filter unit to the camera to which the photographing lens is attached when the spectral transmittance of the optical filter unit is switched.

A third aspect of this invention is applied to a lens-replaceable camera to which the photographing lens described above may be attached detachably. The lens-replaceable camera includes: a lens information input unit that inputs the lens information output from the lens information output unit;

an image pickup unit capable of generating an image signal having at least three bands from an object image formed by the photographing lens;

an image data processing unit that generates image data by processing the image signal generated by the image pickup unit; and a spectral transmittance switch command signal output unit that outputs a signal specifying one of the plurality of spectral transmittances that can be switched by the optical filter unit to the photographing lens.

The image data processing unit generates image data having a larger number of bands than a number of bands included in an image signal generated by the image pickup unit in a single image pickup operation on the basis of a plurality of the image signals having at least three bands, which are obtained by the image pickup unit through image pickup operations performed every time the spectral transmittance of the optical filter unit is switched, and either one of the lens total spectral transmittance information and a combination of the filter spectral transmittance information and lens spectral transmittance information, included in the lens information input from the photographing lens.

A fourth aspect of this invention is applied to a filter switching device. The filter switching device includes: an optical filter unit that is disposed on an optical path of light emitted from an illumination light source for illuminating an object to be photographed by a camera toward the object, and can be switched to any one of a plurality of spectral transmittances;

a spectral transmittance switching unit that switches a spectral transmittance of the optical filter unit to a spectral transmittance selected from the plurality of spectral transmittances;

a filter spectral transmittance information storage unit that stores filter spectral transmittance information, which is information relating to each of the plurality of spectral transmittances; and a filter spectral transmittance information output unit that outputs filter spectral transmittance information corresponding to the selected spectral transmittance to the camera.

A fifth aspect of this invention is applied to an image pickup system having a camera, an illumination light source for illuminating an object to be photographed by the camera, and a filter switching device constituted to be capable of varying a spectral characteristic of illumination light emitted from the illumination light source toward the object by switching a spectral transmittance of an optical filter unit that is disposed on an optical path of the illumination light emitted toward the object and can be switched to any one of a plurality of spectral transmittances. In the image pickup system, the filter switching device includes:

a spectral transmittance switching unit that switches the spectral transmittance of the optical filter unit to a spectral transmittance selected from the plurality of spectral transmittances;

a filter spectral transmittance information storage unit that stores filter spectral transmittance information, which is information relating to each of the plurality of spectral transmittances; and a filter spectral transmittance information output unit that outputs filter spectral transmittance information corresponding to the selected spectral transmittance to the camera, and the camera includes:

a filter spectral transmittance information input unit that inputs the filter spectral transmittance information output from the filter spectral transmittance information storage unit;

an image pickup unit capable of generating an image signal having at least three bands from an object image formed by a photographing lens; and a spectral transmittance switch command signal output unit that outputs a signal specifying one of the plurality of spectral transmittances that can be switched by the optical filter unit to the filter switching device.

An image data processing unit generates image data having a larger number of bands than a number of bands included in an image signal generated by the image pickup unit in a single image pickup operation on the basis of a plurality of the image signals having at least three bands, which are obtained by the image pickup unit through image pickup operations performed every time the spectral transmittance of the optical filter unit is switched, and the filter spectral transmittance information included in the filter spectral transmittance information input from the filter switching unit.

BRIEF DESCRIPTION OF THE DRAWINGS

For a more complete understanding of the present invention and the objects and advantages thereof, reference is now made to the following descriptions taken in connection with the accompanying drawings.

FIG. 10 is a view illustrating an example in which the spectral transmittance of the filter varies according to differences in the incident angle of light impinging on the filter, FIG. 10A showing an outline of the manner in which the light impinges on the filter at different incident angles, FIG. 10B showing an example of variation in the spectral transmittance when the incident angle varies, and FIG. 10C showing an outline of an example in which an image area of the imaging device is divided into a plurality of areas and information relating to the spectral transmittance of the filter and so on is prepared in accordance with each of the divided areas.

DETAILED DESCRIPTION OF THE PREFERRED EMBODIMENTS

Figure 1:
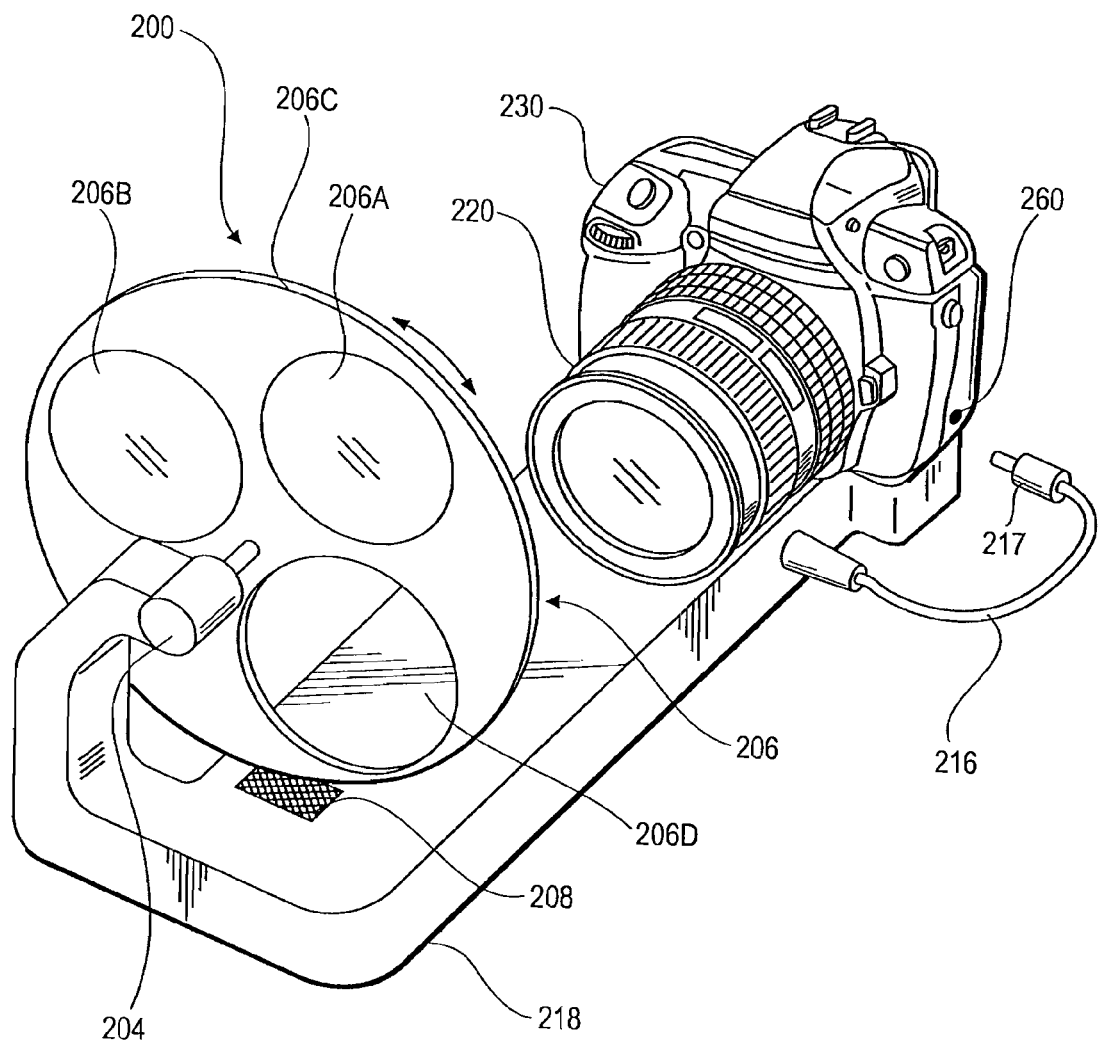
FIG. 1 is a perspective view illustrating an example in which a filter switching device is attached to a camera.

FIG. 1 is a perspective view showing an example in which a filter switching device 200 according to an embodiment of this invention is used together with a camera 230 and a photographing lens 220. In the example shown in FIG. 1, the camera 230 is a single lens reflex type electronic camera in which an imaging device incorporated into the interior thereof is a single plate type device having red (R), green (G) and blue (B) on-chip color filters or a multi-plate type device employing a spectral optical system such as a dichroic prism. The photographing lens 220 can be attached to and detached from the camera 230 freely, and is therefore replaceable. It should be noted, however, that this invention is not limited to the example described above, and the number of colors of the image signals that can be output from the imaging device may be set at four or more. Moreover, the camera 230 is not limited to a single lens reflex type, and the lens may be replaceable or fixed.

The filter switching device 200 includes a motor 204 fixed to one end side of a base unit 218, the other end side of which can be fastened to the camera 230, a filter unit 206, and a sensor unit 208. The filter unit 206 includes a disc 206C that is driven to rotate by the motor 204, and a plurality of filters 206A, 206B disposed in substantially equidistant positions from a rotation center of the disc 206C. An opening portion 206D is provided in the disc 206C. By having the motor 204 rotate the disc 206C and then stop it in a predetermined angular position, the opening portion 206D or one of the filters 206A, 206B can be positioned on an optical path of the photographing lens 220.

In FIG. 1, only two filters 206A, 206B are shown, but three or more filters may be provided. Alternatively, a single filter may be provided. When only one filter is provided, the disc 206C may be omitted, and in its place, a rocker mechanism or a linear motion mechanism that can insert or remove the filter onto or from the optical path of the photographing lens 220 may be used.

Further, a substantially colorless transparent optical member formed from glass, resin, or the like may be disposed in the opening portion 206D. FIG. 1 shows an example in which the filter unit 206 is disposed on a front surface of the photographing lens 220, but the filter unit 206 may be provided in the interior of the photographing lens 220, on the behind thereof, or in another position, as will be described below. In this case, a colorless transparent portion formed from the same material and at the same thickness as the filters 206A, 206B is preferably provided in the opening portion 206D to keep an equivalent optical path length of the photographing lens 220 constant. Further, the filter unit 206 does not necessarily have to include an opening portion or a colorless transparent filter, and may have a desired spectral transmittance.

The sensor unit 208 is provided in the base unit 218 in a position close to an outer edge of the disc 206C. The sensor unit 208 may employ an optical sensor, a Hall sensor, or another type of sensor. The sensor unit 208 is provided to detect the angular position of the disc 206C and thereby detect whether the opening portion 206D, the filter 206A, or the filter 206B is positioned on the optical path of the photographing lens 220. When the sensor unit 208 employs an optical sensor, a so-called photoreflector type optical sensor may be used. In this case, a predetermined reflective/nonreflective pattern is formed on an outer peripheral part of the disc 206C, and by detecting a signal pattern output from the sensor unit 208, the angular position of the disc 206C, or in other words the type of the filter that is positioned on the optical path of the photographing lens 220, can be specified. Similarly, by disposing a magnetic body on the outer edge part of the disc 206C, the angular position of the disc 206C can be specified by a Hall sensor or the like. It should be noted that when the motor 204 has an inbuilt encoder, the sensor unit 208 may be omitted.

A connection cable 216 electrically connects the camera 230 to the filter switching device 200 such that a control signal, information, and so on, to be described below, can be exchanged. By connecting a plug 217 provided on a tip end part of the connection cable 216 to a receptacle 260 provided in the camera 230, control signals and information can be exchanged between the camera 230 and the filter switching device 200.

Figure 2:
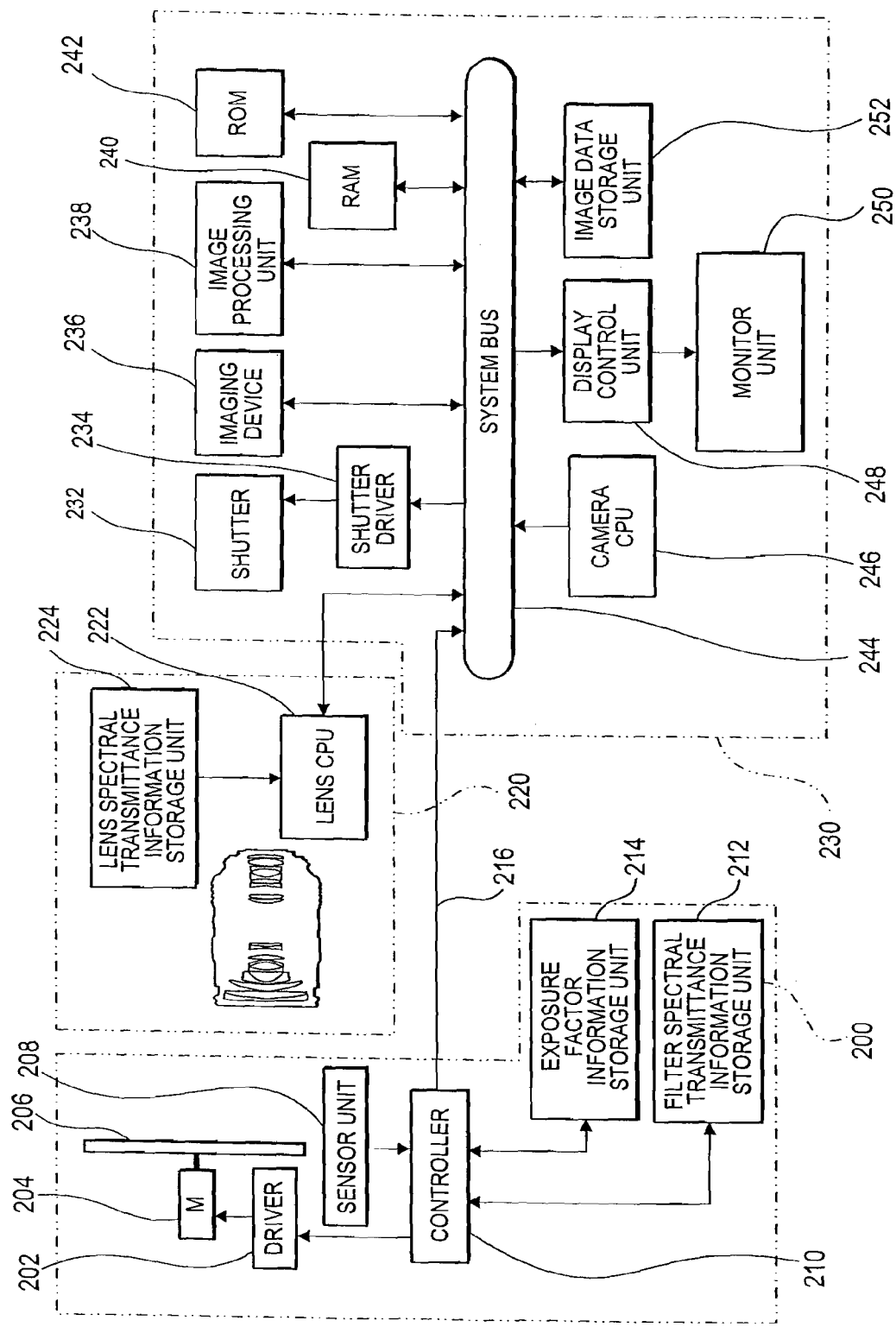
FIG. 2 is a block diagram illustrating an internal constitutional example of the filter switching device, a photographing lens, and the camera.

Referring to FIG. 2, which is a schematic block diagram illustrating an internal circuit configuration of the filter switching device 200, photographing lens 220, and camera 230, the internal constitutions of the filter switching device 200, photographing lens 220, and camera 230 will be described.

—Filter Switching Device—

The filter switching device 200 includes a driver 202 that supplies power to the motor 204 for driving the disc 206C to rotate, the sensor unit 208, a controller 210, an exposure factor information storage unit 214, and a filter spectral transmittance information storage unit 212. The motor 204 and the sensor unit 208 are constituted as described above with reference to FIG. 1. The controller 210 is constituted by a single-chip microcomputer, a logic circuit, or similar.

Information relating to exposure factors corresponding respectively to the filters 206A, 206B is stored in the exposure factor information storage unit 214. An inverse (2, 3, for example) of light amount ratio (1/2, 1/3, for example) after the object light is attenuated when object light passes through the respective filters 206A, 206B may be used as the information relating to the exposure factor. When image pickup is performed using the filters 206A, 206B, exposure amount on a focal plane (hereafter, referred to as "a focal plane exposure amount") that is substantially identical regardless of whether a filter is used or not can be obtained by applying an exposure amount obtained by multiplying the exposure factor by the exposure amount when the filter is not used.

It should be noted that the filters 206A, 206B differ from a so-called ND filter in having wavelength-dependent transmittance, as shown in FIGS. 3, 5, and so on. The information stored in the exposure factor information storage unit 214 is preferably information relating to an exposure factor determined on the basis of spectral transmittance in a wavelength band intended to allow the transmission of light. Alternatively, information relating to the spectral transmittance of the filters 206A, 206B may be stored in the exposure factor information storage unit 214 such that a camera CPU 246 determines the exposure factor upon reception of this information relating to the spectral transmittance.

Information relating to spectral transmittance corresponding respectively to the filters 206A, 206B is stored in the filter spectral transmittance information storage unit 212. The information relating to the filter spectral transmittance may include the transmittances at wavelengths intervals of a 1 nm pitch, a 2 nm pitch, a 5 nm pitch, and a 10 nm pitch, for example, within a wavelength range of 380 nm to 780 nm. Alternatively, the filter spectral transmittance information storage unit 212 may store only filter identification information enabling identification of the types of the filters 206A, 206B. In this case, information relating to the filter spectral transmittance may be stored in the camera 230 such that when the camera 230 receives the filter identification information from the filter switching device 200, information relating to the spectral transmittance corresponding to the received information is read. Alternatively, switchable spectral transmittance information, from which a plurality of spectral transmittance that can be switched by the filter switching device 200 can be specified, can be stored in the filter spectral transmittance information storage unit 212. The switchable spectral transmittance information is referenced by the camera 230 when the camera 230 is set in a multiband image pickup mode, to be described in detail below.

The controller 210 receives a signal indicating a spectral transmittance from the camera 230 via the connection cable 216. The controller 210 executes a spectral transmittance switching operation by driving the motor 204 via the driver 202 while detecting a signal output from the sensor unit 208 such that the filter having the desired spectral transmittance is positioned on the image pickup optical path. The controller 210 then reads the exposure factor-related information and the filter spectral characteristic-related information corresponding to the filter positioned on the optical path of the object light from the exposure factor information storage unit 214 and the filter spectral transmittance information storage unit 212, respectively, and outputs this information to the camera 230.

—Photographing Lens—

The photographing lens 220 includes a lens spectral transmittance information storage unit 224 and a lens CPU 222. The lens CPU 222 begins intercommunication with the camera CPU 246 when power is supplied to the camera 230. This intercommunication is performed repeatedly at an appropriate timing such as when variation in an established focal length, an axial displacement of a focusing lens, or so on occurs in the photographing lens 220, when power is supplied to the camera 230, when a release operation (including a half-press operation of a release switch) is performed in the camera 230, and so on.

The lens spectral transmittance information storage unit 224 stores information relating to a lens spectral transmittance of the photographing lens 220. The information relating to the lens spectral transmittance may include the transmittances at wavelengths intervals of a 1 nm pitch, a 2 nm pitch, a 5 nm pitch, a 10 nm pitch, a 50 nm pitch, and a 100 nm pitch, for example, within a wavelength range of 380 nm to 780 nm.

—Camera—

The camera 230 includes a shutter driver 234, a shutter 232, an imaging device 236, an image processing unit 238, a RAM 240, a ROM 242, the camera CPU 246, a display control unit 248, a monitor unit 250, and an image data storage unit 252. The camera CPU 246, display control unit 248, image data storage unit 252, shutter driver 234, image processing unit 238, RAM 240, and ROM 242 are electrically connected to each other via a system bus 244.

The camera CPU 246 performs overall control of the operations of the camera 230. For example, when the camera 230 is set in a recording (Photographing) mode, the camera CPU 246 controls focus adjustment, light metering, exposure control, and so on. Further, when the camera 230 is set in a reproduction mode, the camera CPU 246 performs processing to receive user operations such as switching an image displayed on the monitor unit 250 and switching a compression/enlargement display.

The shutter 232 is used to adjust the amount of object light incident on a light-receiving surface of the imaging device 236, and is constituted by a focal-plane shutter, for example. The shutter 232 has a front curtain and a rear curtain, and these curtains are latched by a mechanism employing electromagnets or the like that prevents the curtains from traveling. The camera CPU 246 controls the travel start timing of the front curtain and rear curtain by electrifying the front curtain electromagnet via the shutter driver 234 and then electrifying the rear curtain electromagnet following the elapse of a predetermined exposure time, and thus, the exposure time applied to the imaging device 236 can be controlled.

As described above, the imaging device 236 may include three on-chip color filters in G, B, R. The imaging device 236 is constituted by a CCD or a C-MOS image sensor. In this embodiment, the imaging device 236 includes in its interior an array of two-dimensionally disposed photoelectric conversion elements, and a circuit block that performs processing such as CDS (correlated double sampling), AGC (automatic gain control), and A/D conversion on an analog signal output from the photoelectric conversion element array and outputs a digital image signal. Thus, a digital image signal can be output from the imaging device 236.

The digital image signal output from the imaging device 236 is transferred to the RAM 240 via the system bus 244, and stored temporarily as unprocessed image data. The RAM 240 is preferably constituted by an SDRAM or the like, which exhibits superior memory access speed. The image processing unit 238 is constituted by an ASIC (Application Specific Total Circuit) or the like, and performs demosaicing processing, tone correction processing, color balance adjustment, unsharp mask processing, and the like on the unprocessed image data stored temporarily in the RAM 240 as described above, thereby generating image data. The image processing unit 238 also performs processing to generate multiband image data in the multiband image pickup mode to be described below.

The ROM 242 is constituted by a mask ROM, an EEPROM, or the like, and stores a program executed by the camera CPU 246, various control parameters and information used in the camera 230, and so on. It should be noted that when the ROM 242 is constituted by an EEPROM, the program recorded in the ROM 242 is preferably read and stored to the RAM 240 and then read in sequence by the camera CPU 246 from the RAM 240 in order to increase the processing speed of the camera CPU 246.

The monitor unit 250 is constituted by a TFT color liquid crystal display device, an organic EL display device, or similar, and is provided on a rear surface of the camera 230. The monitor unit 250 is constituted to be capable of displaying an image obtained through image pickup, displaying various setting menus, and so on.

Once the filter switching device 200 and the photographing lens 220 described above have been attached to the camera 230, a user (photographer) can set the camera 230 to the multiband image pickup mode to be described below. The user then sets the spectral transmittance (filter) to be used during the upcoming multiband image pickup operation, the number of shots to be taken in the image pickup operation, and the like on a multiband image pickup mode setting screen.

Having received the user operations described above, the camera CPU 246 issues a control signal to the filter switching device 200 to switch the spectral transmittance. The camera 230 is then controlled in accordance with the switched spectral transmittance of the filter unit 206 such that image pickup is performed a plurality of times in relation to the same object. At this time, the camera CPU 246 inputs the information relating to the exposure factor and the information relating to the filter spectral transmittance from the filter switching device 200, and inputs the information relating to the lens spectral transmittance from the photographing lens 220. The camera CPU 246 then outputs the input information to the image processing unit 238. It should be noted that when image pickup is performed a plurality of times, the camera CPU 246 preferably adjusts the shutter speed and so on in accordance with the exposure factor corresponding to the filter spectral transmittance set by the filter switching device 200. In other words, the exposure amount is preferably adjusted in accordance with the exposure factor such that the focal plane exposure amount is substantially constant in each of the plurality of image pickup operations. By adjusting the exposure amount in this manner, the focal plane exposure amount applied to the imaging device 236 can be maintained at a substantially constant level even when a filter having a lower overall transmittance is used, and thus the S/N ratio of the image signal can be maintained. Alternatively, instead of making the focal plane exposure amount substantially constant, an equivalent ISO sensitivity of the imaging device 236 may be adjusted in accordance with the exposure factor.

The image processing unit 238 generates multiband image data by performing image processing on the basis of the plurality of image data obtained after image pickup has been performed a plurality of times on the same object, and the information input from the camera CPU 246.

Figure 3A:
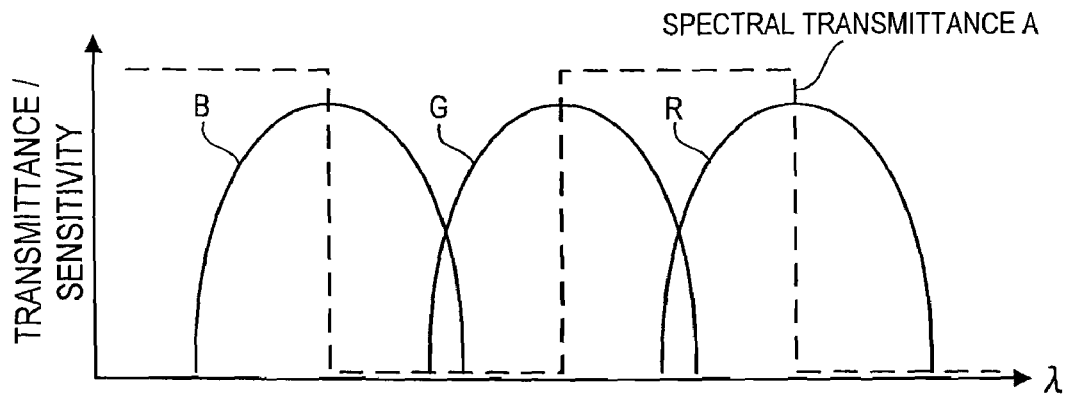
FIG. 3 is a schematic diagram showing a relationship among spectral transmittances of optical filters and spectral sensitivities of pixels in each color of an imaging device, FIGS. 3A, 3B and 3C showing examples in which respective optical filters have different spectral transmittances.
Figure 3B:
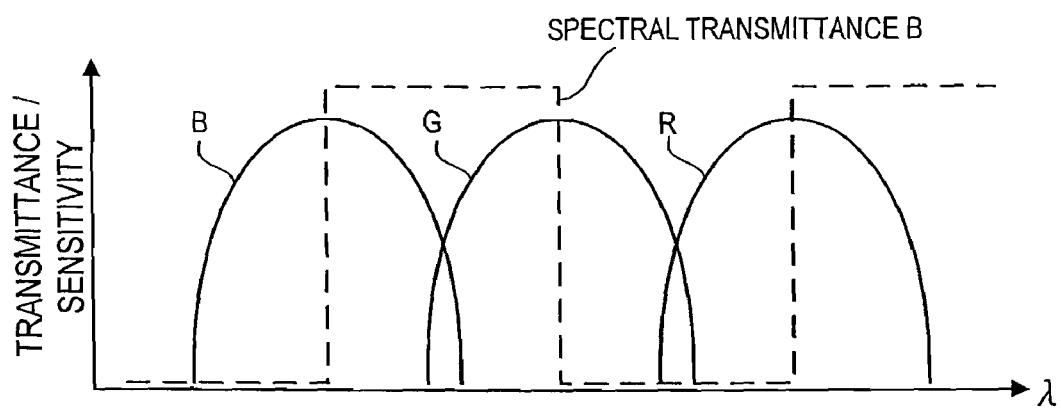
Figure 3C:
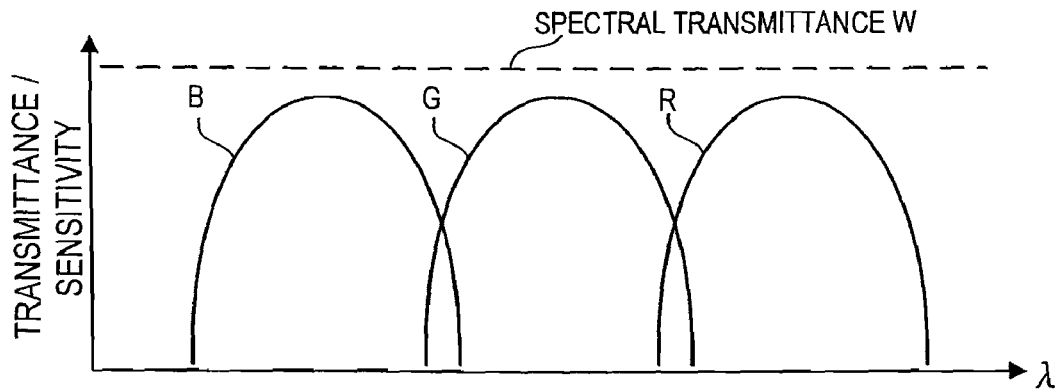

Referring to FIG. 3, the spectral transmittance of the filters 206A, 206B will be described. FIG. 3 is a schematic diagram showing a relationship between the spectral sensitivity characteristics of the B, G, R pixels constituting the imaging device 236 and the spectral transmittance of the filters 206A, 206B, in which wavelength (lambda) is shown on the abscissa, and transmittance and sensitivity are shown on the ordinate. A spectral transmittance A of the filter 206A and a spectral transmittance B of the filter 206B are shown in FIGS. 3A and 3B, respectively, together with the spectral sensitivity characteristics (curves indicated by the symbols B, G, R in FIG. 3) of the B, G, R pixels constituting the imaging device 236. FIG. 3C shows a spectral transmittance W of the opening portion 206D. The spectral transmittance W corresponds to the opening portion 206D, as shown in FIG. 1. In other words, only air exists in the opening portion 206D, and therefore the spectral transmittance W is 100%, regardless of the wavelength.

In the examples shown in FIGS. 3A and 3B, the spectral transmittance A and B respectively has a rectangular waveform characteristic according to which the transmittance varies precipitously in relation to wavelength variation, and the respective phases thereof have a mutually opposing relationship. Further, the spectral transmittance of rising edges and falling edges of the rectangular wave are determined such that respective profiles of the spectral sensitivities of the B, G, R pixels constituting the imaging device 236 are segmented into a short wavelength side and a long wavelength side in the vicinity of a peak wavelength thereof.

Figure 4A:
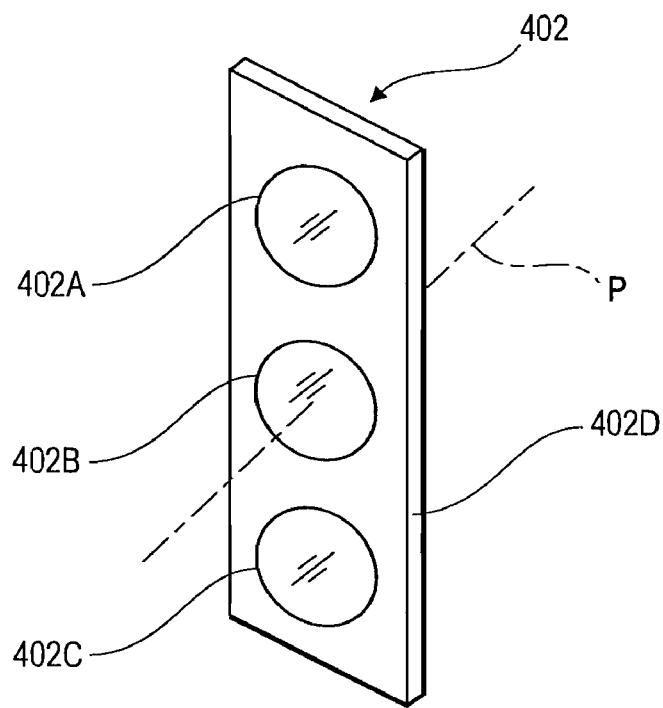
FIG. 4 is a perspective view showing a different example to FIG. 1 of a filter unit of the filter switching device, FIG. 4A showing an example in which a desired filter can be caused to advance and retreat on an optical path of the photographing lens by having a holding frame that holds the filter perform a linear motion in an orthogonal plane to the optical axis of the photographing lens, and FIG. 4B showing an example in which filters are held by arms respectively rotating about a rotation axis parallel to the optical axis of the photographing lens, and are constituted to be capable of advancing and retreating on the optical path of the photographing lens.

FIG. 4 is a view showing examples of different devices for switching the spectral transmittance of the filter to that shown in FIG. 1. In FIG. 4A, a filter unit 402 includes three filters 402A, 402B, 402C, and a holding frame 402D for holding the filters 402A, 402B, 402C. The holding frame 402D is constituted to be capable of moving on a plane that intersects an optical axis P of the photographing lens 220 substantially at a right angle, and the spectral transmittance is switched by ensuring that one of the filters is positioned on the optical path of the object light that passes through the photographing lens 220. A combination of a pinion gear driven to rotate by a motor and a rack gear, an electromagnetically driven actuator, an ultrasonic motor, or the like may be used to move the holding frame 402D.

Figure 4B:
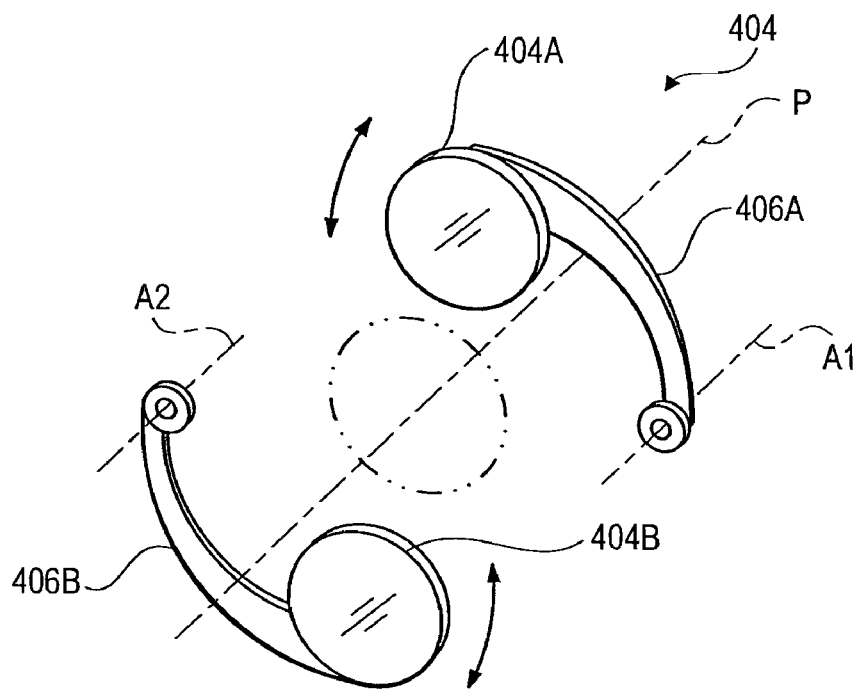

In FIG. 4B, a filter unit 404 includes two filters 404A and 404B, and arms 406A, 406B that hold the filters 404A, 404B. The arms 406A, 406B are constituted to be capable of rotating about rotary axes A1, A2 extending in a substantially parallel direction to the optical axis P of the photographing lens 220. As the arms 406A, 406B rotate, the filters 404A, 404B move on a substantially orthogonal plane to the optical axis P. By driving the arms 406A, 406B to rotate, the filter 404A or the filter 404B is positioned on the optical path of the object light that passes through the photographing lens 220, and thus the spectral transmittance is switched. To drive the arms 406A, 406B, a motor, an electromagnetically driven actuator, an ultrasonic motor, or another device may be used.

Figure 5A:
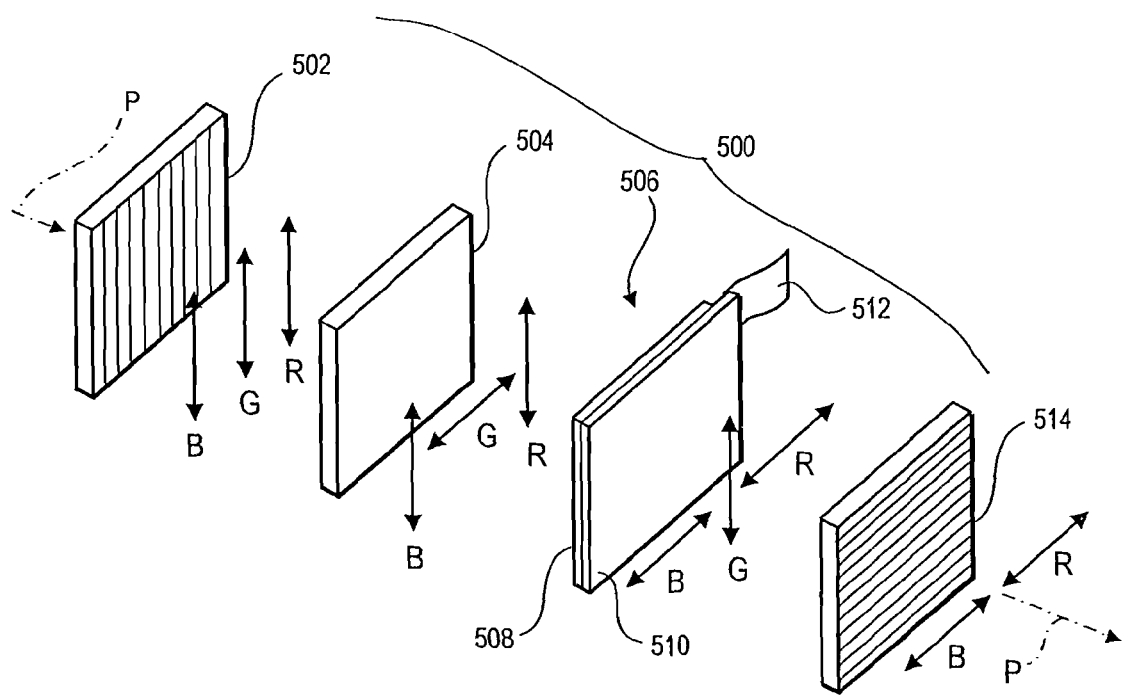
FIG. 5 is a view showing an example in which the spectral transmittance of the filter unit of the filter switching device can be switched electrically, FIG. 5A showing the schematic constitution thereof in the form of a perspective view and FIG. 5B showing an example of the spectral transmittance.
Figure 5B:
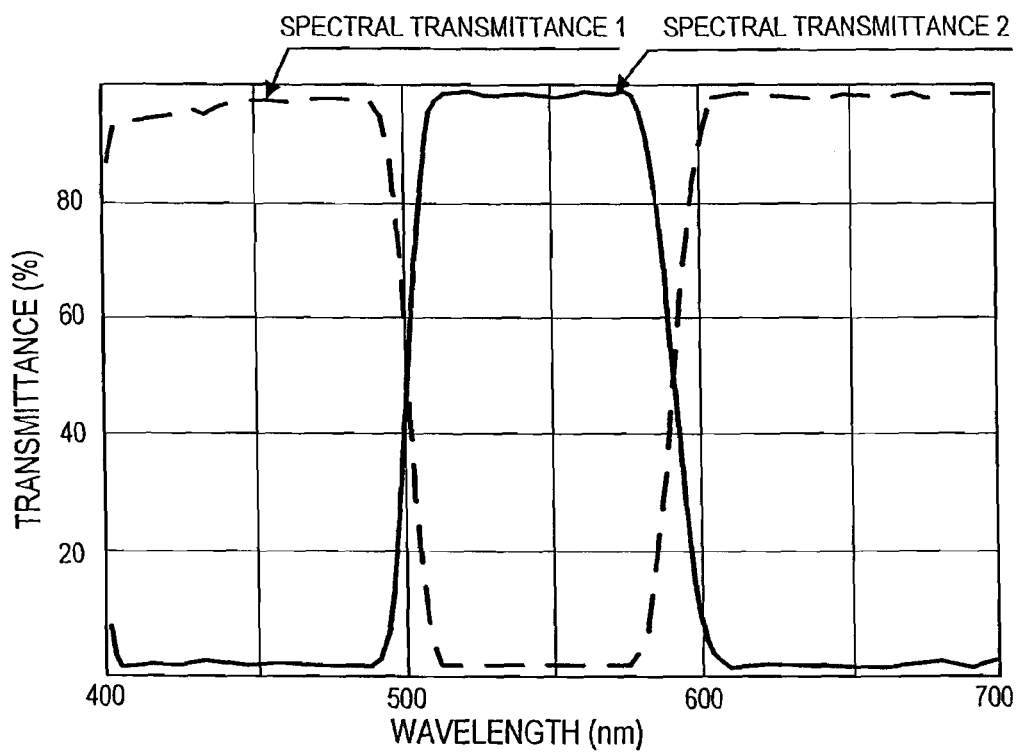

An example in which the spectral transmittance is switched by positioning one of a plurality of optical filters having different spectral transmittance on the optical path of the object light that passes through the photographing lens 220 was described above with reference to FIGS. 1 and 4. FIG. 5, on the other hand, illustrates an example in which the spectral transmittance can be switched electrically. FIG. 5A shows the constitution of this example, and FIG. 5B shows the spectral transmittance.

In FIG. 5A, a filter unit 500 includes, in order of passage of the object light, a polarizing plate 502, a polarization rotator 504 having wavelength selectivity, a polarization modulator 506, and a polarizing plate 514. FIG. 5 shows these elements to be separated from each other along the optical axis of the photographing lens 220, but in actuality, they are disposed in close proximity to each other. In this specification, a polarization rotator having wavelength selectivity will be referred to as a "wavelength selective polarization rotator".

The polarizing plate 502 acts as a polarizer that outputs input nonlinearly polarized light as linearly polarized light. In FIG. 5A, polarized light passing through the polarizing plate 502 has a vibration direction that corresponds to the vertical direction of the figure. In this specification, this direction will be referred to as a "vertical vibration direction". Further, a vibration direction that is oriented orthogonally to the vertical vibration direction in an orthogonal plane to the optical path P will be referred to as a "horizontal vibration direction".

The wavelength selective polarization rotator 504 functions to rotate the vibration direction of light in a specific wavelength band of the input polarized light by 90° (P/S conversion or S/P conversion). In FIG. 5A, the polarization action is performed on only light in the G band of the input light such that the light is output after the vibration direction thereof has been converted to an orthogonal direction to the vibration direction of the input G polarized light. In other words, of the B, G, R linearly polarized light having a vertical vibration direction that passes through the polarizing plate 502 serving as a polarizer, only the polarized direction of the G light is rotated by the wavelength selective polarization rotator 504 and thereby converted into linearly polarized light having a horizontal vibration direction.

The polarization modulator 506 is an element constituted by sealed liquid crystal between two transparent substrates 508, 510. Transparent electrodes are provided on mutually opposing surfaces of the transparent substrates 508, 510. When a drive voltage is applied to the polarization modulator 506 via a flexible printed circuit board 512, the polarization rotation effect on the light passing through the polarization modulator 506 can be changed. In the example shown in FIG. 5, the vibration direction of the linear polarized B, G, R lights are varied by 90°. As a result, polarization rotation is performed such that the B, R linear polarized lights respectively has a horizontal vibration direction and the G linear polarized light has a vertical vibration direction.

The polarizing plate 514 acts as an analyzer through which only the light that has a horizontal vibration direction in FIG. 5A can pass. In FIG. 5A, only the R light and B light having the horizontal vibration direction pass through the polarizing plate 514. With the constitution described above, the spectral transmittance is switched to a spectral transmittance 1 shown in FIG. 5B, whereby of the white light that passes through the filter unit 500, only the R light and B light pass.

On the other hand, by switching the drive voltage applied to the polarization modulator, it is possible to ensure that the vibration direction of the light passing through the polarization modulator 506 is not varied. In this case, of the light input into the polarizing plate 514 serving as an analyzer, the B light and R light have a vertical vibration direction and the G light has a horizontal direction. Therefore, only the G light can pass through the polarizing plate 514, and thus the spectral transmittance is switched to a spectral transmittance 2 shown in FIG. 5B.

It should be noted that in all of the cases described above, the light output by the filter unit 500 is linear polarized light. When the camera 230 is a single lens reflective type AF camera, a half mirror or the like is provided to lead a part of the object light introduced into a viewfinder optical system to a focus detection optical system. In this case, when the light passing through the filter unit 500 is linear polarized light, it may be impossible to lead a sufficient amount of light to the focus detection optical system. In such a case, a wave plate such as a quarter-wave plate is preferably provided on the output side of the filter unit 500.

Figure 6:
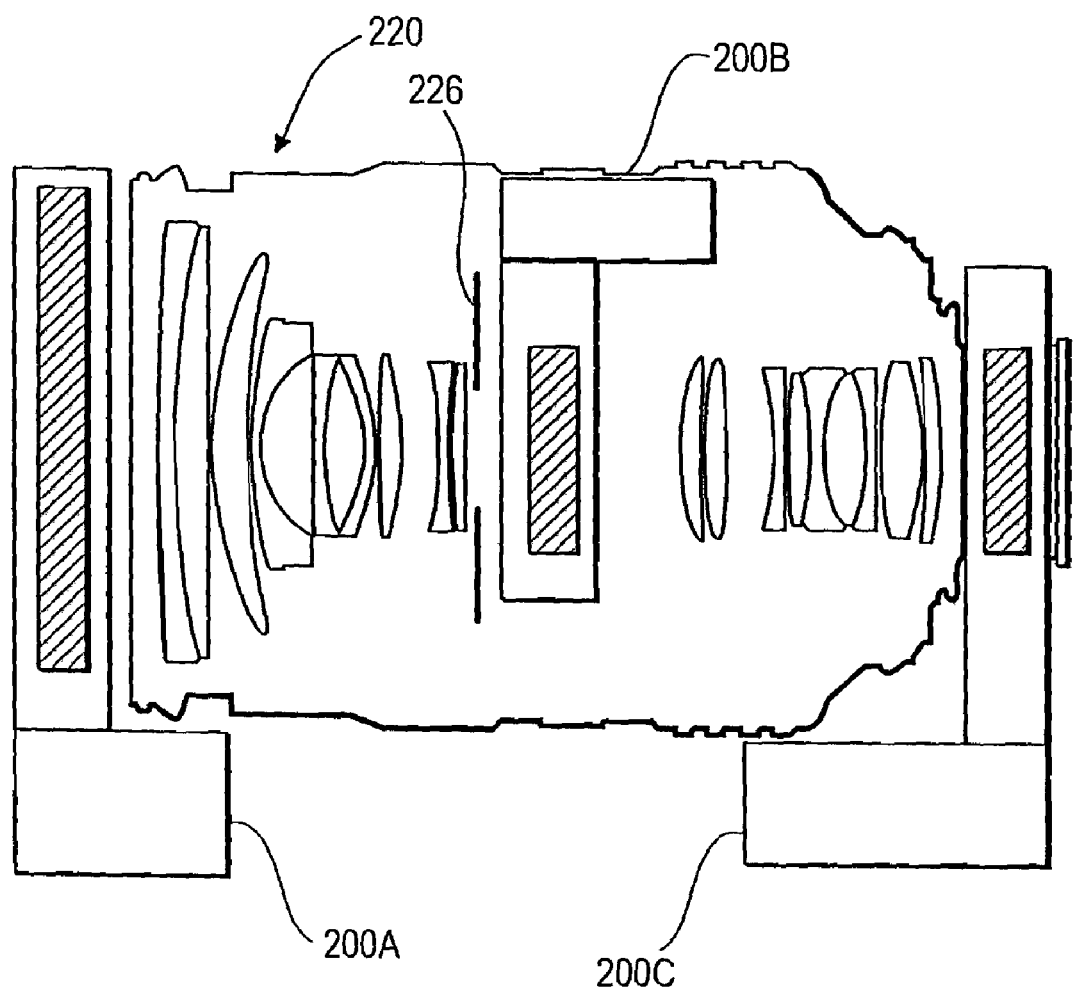
FIG. 6 is a view showing examples of disposing positions of filter switching device.

FIG. 6 is a view illustrating disposal positions of the filter switching device 200 described above relative to the photographing lens 220. In FIG. 6, a filter switching device 200A is disposed on a front side (incident side) of the photographing lens 220. A filter switching device 200B is disposed in the interior of the photographing lens 220 in the vicinity of a diaphragm 226. A filter switching device 200C is disposed on a rear side (exit side) of the photographing lens 220. When the filter switching device is disposed on the rear side of the photographing lens 220, as is the filter switching device 200C, a lens attachment mount surface of the camera 230 and a mount surface of the photographing lens 220 are separated from each other in the optical axis direction of the photographing lens 220, and as a result, a situation in which it is only possible to focus on an object positioned at a shorter object distance may arise. In this case, an object positioned at any distance can be focused on by incorporating an optical system that shifts the image forming plane of the photographing lens 220 toward the rear of the photographing lens 220.

When the filter switching device is disposed on the front side of the photographing lens 220, as is the filter switching device 200A, multiband image pickup using a conventional photographing lens and camera becomes easy. When the filter switching device is incorporated into the interior of the photographing lens 220, as is the filter switching device 200B, the photographing lens 220 must be constituted so that the filter switching device 200B can be incorporated therein. However, in the vicinity of the diaphragm 226, light flux is comparatively reduced and an angle formed by a principal ray of the light flux passing through the photographing lens 220 and the optical axis of the photographing lens 220 is comparatively small, and therefore the following advantages can be obtained. When the light flux is comparatively reduced, the filter switching device 200B can be formed in a comparatively small size. Further, when the angle formed by the principal ray of the light flux passing through the photographing lens 220 and the optical axis of the photographing lens 220 is comparatively small, an incident angle at which the object light enters the filter switching device 200B is comparatively small. When the filter switching device 200B includes an interference filter or has the constitution shown in FIG. 5A, the spectral transmittance may vary according to the light incident angle, as will be described in detail below. However, by disposing the filter switching device 200B in the vicinity of the diaphragm of the photographing lens 220, variation in the spectral transmittance caused by differences in the incident angle of the object light impinging on the filter switching device 200B can be suppressed.

When the filter switching device is provided on the rear side of the photographing lens 220, as is the filter switching device 200C, the filter switching device 200C can be formed in a comparatively small size, similarly to the filter switching device 200B. Furthermore, when the photographing lens 220 is of telecentric type or close thereto on an image side, the principal ray of the light emanating from a lens element disposed on a final portion toward the imaging device is substantially parallel to the optical axis of the photographing lens 220, and therefore variation in the spectral transmittance caused by differences in the incident angle of the object light impinging on the filter switching device 200C can be suppressed.

Examples in which the filter switching device is externally attached (attached at a later time) to the photographing lens 220, the photographing lens 220 not being originally provided with the filter switching device, were described above. However, the filter switching device may also be built into the photographing lens. An example of this will now be described with reference to FIG. 7.

Figure 7:
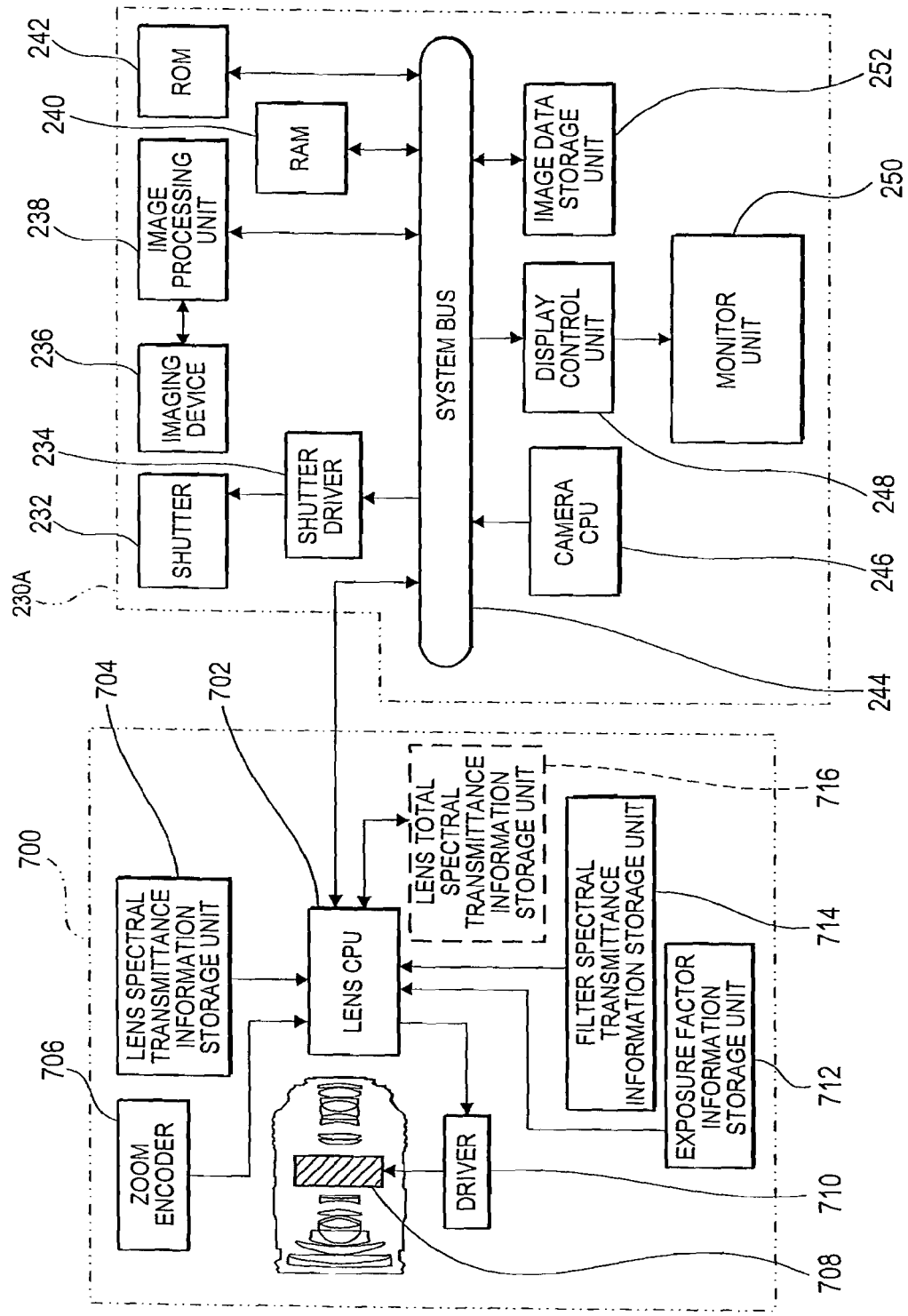
FIG. 7 is a block diagram illustrating an internal constitutional example of the photographing lens and the camera when the filter switching device is built into the photographing lens.

FIG. 7 is a schematic block diagram illustrating an internal circuit configuration of a camera 230A and a photographing lens 700 having a built-in filter switching device. In FIG. 7, constitutional elements that are similar to those shown in FIG. 2 have been allocated identical reference symbols, and description thereof has been omitted. The following description centers on differences with the constitution shown in FIG. 2.

In FIG. 2, the camera 230 communicates with the filter switching device 200 via the connection cable 216. In FIG. 7, on the other hand, the camera 230A performs communication via a contact portion, not shown in the figure, that is provided in the vicinity of the mount portions (lens side mount portion and body side mount portion) of both the photographing lens 700 and the camera 230A and electrically connected when the photographing lens 700 is attached to the camera 230A.

Further, the photographing lens 700 is a variable focal length optical system capable of varying the focal length. The photographing lens 700 includes a zoom encoder 706, a lens spectral transmittance information storage unit 704, a lens CPU 702, a filter spectral transmittance information storage unit 714, an exposure factor information storage unit 712, a driver 710, and an optical filter switching unit 708. A signal corresponding to an established focal length of the photographing lens 700 is output from the zoom encoder 706. Information relating to the lens spectral transmittance of the photographing lens 700 is stored in the lens spectral transmittance information storage unit 704. As described above with reference to FIG. 2, the information relating to the lens spectral transmittance may include information relating to transmittances at wavelengths intervals of a 1 nm pitch, a 2 nm pitch, a 5 nm pitch, a 10 nm pitch, a 50 nm pitch, and a 100 nm pitch, for example, within a wavelength range of 380 nm to 780 nm.

The optical filter switching unit 708 may include any one of the filter units described with reference to FIG. 1, FIG. 4 and FIG. 5.

Information relating to each of a plurality of filter spectral transmittance that can be switched by the optical filter switching unit 708 is stored in the filter spectral transmittance information storage unit 714. Similarly to the lens spectral transmittance information storage unit 704, the information relating to the filter spectral transmittance may include information relating to transmittances at wavelengths intervals of a 1 nm pitch, a 2 nm pitch, a 5 nm pitch, and a 10 nm pitch, for example, within a wavelength range of 380 nm to 780 nm. The information stored in the filter spectral transmittance information storage unit 714 preferably corresponds to a combination of the established focal length of the photographing lens 700 and the spectral transmittance set by the optical filter switching unit 708.

Alternatively, the filter spectral transmittance information storage unit 714 may store only filter identification information enabling identification of the types of the filter spectral transmittances that can be switched by the optical filter switching unit 708. In this case, information relating to the filter spectral transmittance may be stored in the camera 230A such that when the camera CPU 246 receives the filter identification information from the photographing lens 700, information relating to the filter spectral transmittance corresponding to the filter identification information is retrieved.

Further, switchable spectral transmittance information, which is information enabling the camera 230A to identify the plurality of spectral transmittances that can be switched by the optical filter switching unit 708, is also stored in the filter spectral transmittance information storage unit 714. The switchable spectral transmittance information is referenced by the camera CPU 246 when the camera 230A is set in the multiband image pickup mode, to be described in detail below.

Instead of the combination of the lens spectral transmittance information storage unit 704 and the filter spectral transmittance information storage unit 714 described above, a lens total spectral transmittance information storage unit 716 may be provided. The lens total spectral transmittance characteristic information storage unit 716 stores information relating to a total spectral transmittances of the photographing lens 700, which is obtained by adding together the spectral transmittance of the photographing lens 700 and the plurality of filter spectral transmittances that can be switched by the optical filter switching unit 708. The information stored in the lens total spectral transmittance information storage unit 716 preferably corresponds to all combinations of the established focal length of the photographing lens 700 and the spectral transmittance of the used optical filters.

In the following description, it is assumed that the photographing lens 700 includes the lens total spectral transmittance information storage unit 716 and the information stored in the lens total spectral transmittance information storage unit 716 is information corresponding to all combinations of the established focal length of the photographing lens 700 and the spectral transmittance set by the optical filter switching unit 708. It is also assumed that the lens total spectral transmittance information storage unit 716 stores the switchable spectral transmittance information described above.

The lens CPU 702 begins communication with the camera CPU 246 when power is supplied to the camera 230A. This communication is performed repeatedly at an appropriate timing when variation in the established focal length, axial displacement of a focusing lens, and so on of the photographing lens 700 occurs, when power is supplied to the camera 230A, when a release operation (including a half-depress operation of the release switch) is performed in the camera 230A, and so on. The lens CPU 702 also receives a filter spectral transmittance switch control signal output by the camera CPU 246, and switches the filter spectral transmittance of the optical filter switching unit 708 via the driver 710.

When the filter spectral transmittance switching operation performed by the optical filter switching unit 708 is complete, the lens CPU 702 outputs a filter spectral transmittance switch completion signal to the camera CPU 246. The lens CPU 702 also outputs lens total spectral transmittance information corresponding to the currently established focal length of the photographing lens 700 and the filter spectral transmittance switched by the optical filter switching unit 708 to the camera CPU 246.

The camera CPU 246 determines an exposure amount on the basis of the lens total spectral transmittance information received from the lens CPU 702, and then executes an exposure operation.

Figure 8A:
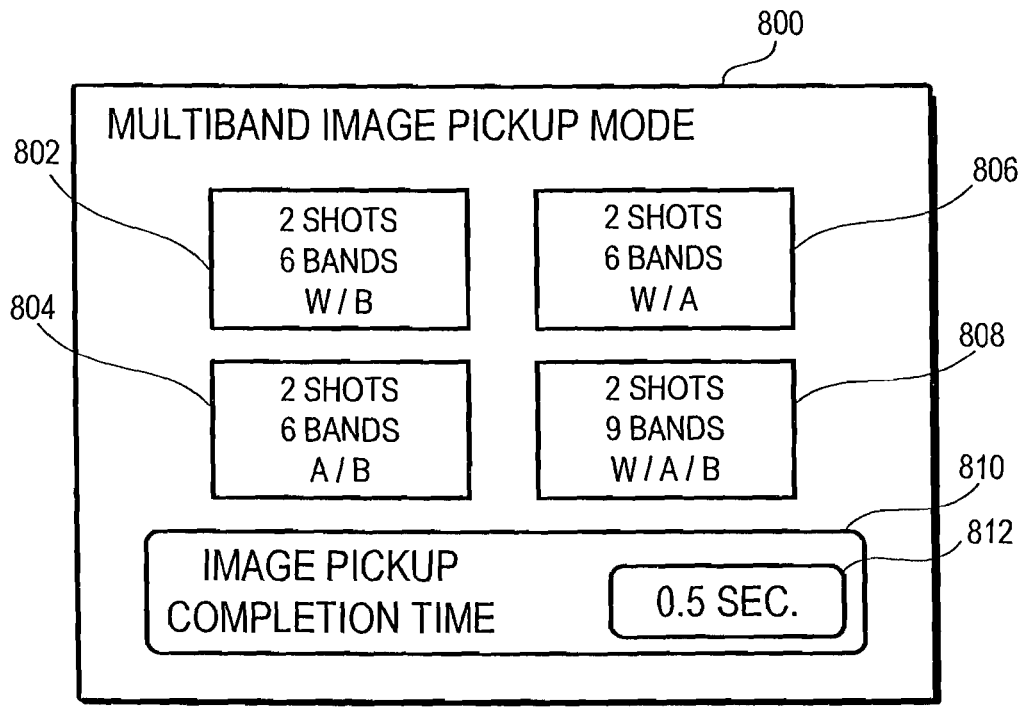
FIG. 8 is a view illustrating an example in which multiband image pickup is performed by performing image pickup a plurality of times while switching the spectral transmittance of the filter, FIG. 8A showing an example of a displayed multiband image pickup setting screen and FIG. 8B showing an outline of a sequence executed during image pickup in the multiband image pickup mode.

FIG. 8A is a view showing an example of a menu screen displayed on the monitor 250 when the user opens a multiband image pickup mode setting menu. Four choices 802, 804, 806, 808 are displayed on a menu screen 800 as multiband image pickup settings that can be selected by the user.

The choice 802 corresponds to a setting in which the filter spectral transmittances switched by the optical filter switching unit 708 are set at W and B (see FIG. 3) and 6-band image data are obtained by performing image pickup twice. More specifically, when image pickup is performed after switching the filter spectral transmittance to W in the optical filter switching unit 708, comparatively broadband B, G, R 3-band image data are obtained from the imaging device 236. When image pickup is then performed after switching the filter spectral transmittance to B in the optical filter switching unit 708, 3-band image data constituted by B and R image data having a comparatively narrow bandwidth and a band center that deviates toward a shorter wavelength and G image data having a similar comparatively narrow bandwidth and a band center that deviates toward a longer wavelength are obtained from the imaging device 236. These image data are processed by the image processing unit 238 to generate multiband image data constituted by six bands. During the processing to generate the multiband image data, the image processing unit 238 uses the lens total spectral transmittance information output from the photographing lens 700.

The choice 804 corresponds to a similar setting to that described above, in which the filter spectral transmittance switched by the optical filter switching unit 708 are set at A and B (see FIG. 3) and 6-band image data are obtained by performing image pickup twice. The choice 806 corresponds to a setting in which the filter spectral transmittance switched by the optical filter switching unit 708 are set at W and A, and 6-band image data are obtained by performing image pickup twice. The choice 808 corresponds to a setting in which the filter spectral transmittance switched by the optical filter switching unit 708 are set at W, A and B, and 9-band image data are obtained by performing image pickup three times.

Figure 8B:
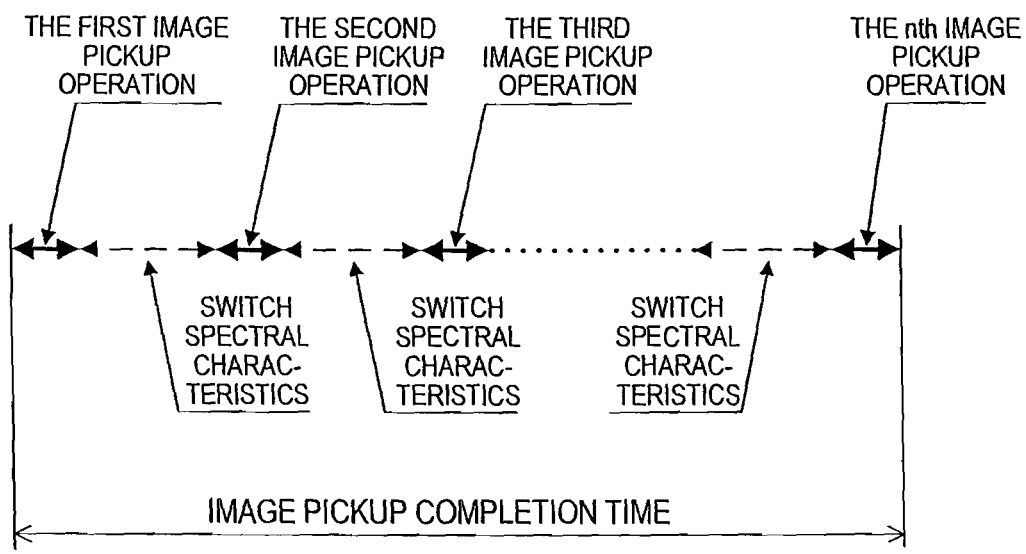

An image pickup completion time setting portion 810 displayed on the menu screen 800 will now be described. The image pickup completion time setting portion 810 sets a time required for the image pickup operation when multiband image data are generated by performing image pickup a plurality of times while switching the filter spectral transmittance in the optical filter switching unit 708. More specifically, the image pickup completion time is the time required to complete a final image pickup operation (exposure operation) from the start of a first image pickup operation (exposure operation) when performing a series of image pickup operations in which image pickup is performed a plurality of times while switching the filter spectral transmittance in the optical filter switching unit 708. The image pickup completion time will now be described with reference to FIG. 8B. In FIG. 8B, image pickup is performed n times, from a first time to an nth time, within the image pickup completion time, and the filter spectral transmittance is switched between each image pickup operation.

When the object is a stationary object that does not move during image pickup, the length of time required to complete the nth image pickup operation from the start of the first image pickup operation is highly unlikely to cause a problem. However, when there is a possibility that the object will move, or when the camera 230A is not fixed to a tripod or the like, the time required to complete the nth image pickup operation from the start of the first image pickup operation is an important element. The reason for this is that a single set of multiband image data is generated on the basis of the plurality of sets of RGB 3-band image data obtained during the plurality of image pickup operations, and therefore, if the composition shifts or the object moves during the plurality of image pickup operations, the obtained multiband image data may become visually unpleasant due to color shift or blurring.

To address this problem, the user who selects one of the choices 802, 804, 806, 808 in the multiband image pickup mode prior to image pickup is permitted to set the image pickup completion time when image pickup is performed a plurality of times in the multiband image pickup mode. At this time, an image pickup completion time display/setting portion 812 is displayed in the image pickup completion time setting portion 810. The time displayed on the image pickup completion time display/setting portion 812 is dependent on the multiband image pickup mode selected by the user, the equivalent ISO sensitivity of the imaging device 236, the luminance of the object, the aperture value of the photographing lens 700, the time required to switch the spectral transmittance, the number of switching operations, and so on. When the equivalent ISO sensitivity of the imaging device 236 is set low, when the object luminance is comparatively low, and when the aperture value set in the photographing lens 700 is larger (the aperture diameter is smaller), the established shutter speed is low (the shutter opening time is established to be longer), and therefore the image pickup completion time increases. The image pickup completion time also increases when the number of spectral transmittance switching operations increases or the number of image pickup operations increases.

In this embodiment, similarly to a case in which a "program AE mode", an "aperture priority AE mode", a "shutter speed priority AE mode", a "manual exposure setting mode", and so on are provided as the exposure modes of the camera, the camera 230A is provided with a "multiband image pickup completion time priority mode". When this mode is selected, the image pickup completion time setting portion 810 is displayed, and in addition, a time calculated on the basis of currently set exposure parameters (the established aperture value of the lens 700, the established equivalent ISO sensitivity of the imaging device 236, and so on), the object luminance, the number of spectral transmittance switching operations, and the number of image pickup operations and so on is displayed on the image pickup completion time display/setting portion 812. The user views the displayed image pickup completion time and determines whether or not the image pickup completion time is suitable for the conditions in which image pickup is about to take place. When the user wishes to increase or reduce the displayed image pickup completion time, s/he can modify the image pickup completion time on the image pickup completion time display/setting portion 812.

On the basis of the image pickup completion time modified by the user, the camera CPU 246 determines the exposure parameters. For example, when the image pickup completion time priority mode is selected and the image pickup completion time is modified to a shorter time than the image pickup completion time determined according to the currently set exposure parameters, the camera CPU 246 reduces the established aperture value (increases the aperture diameter) of the photographing lens 700. Instead of reducing the established aperture value of the photographing lens 700, or at the same time as the set aperture value is reduced, the equivalent ISO sensitivity of the imaging device 236 may be increased. Alternatively, a constitution whereby only the choices suitable for the desired image pickup completion time of the user, from among the choices 802 to 808, are displayed on the menu screen 800 may be employed.

Figure 9A:
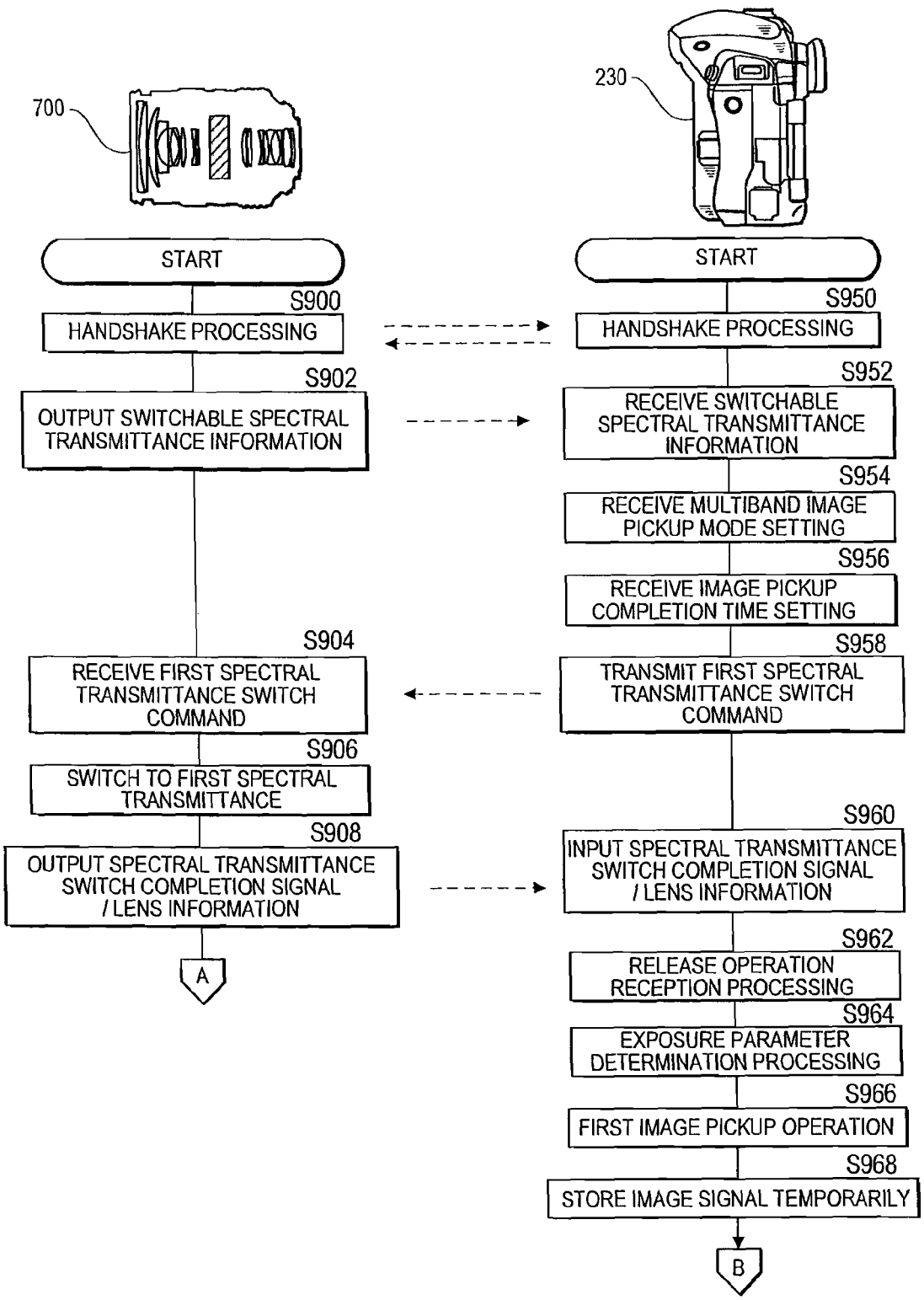
FIG. 9 is a flowchart illustrating a multiband image pickup procedure executed by a CPU of the photographing lens having a built-in filter switching device and an internal CPU of the camera, both shown in FIG. 7.
Figure 9B:
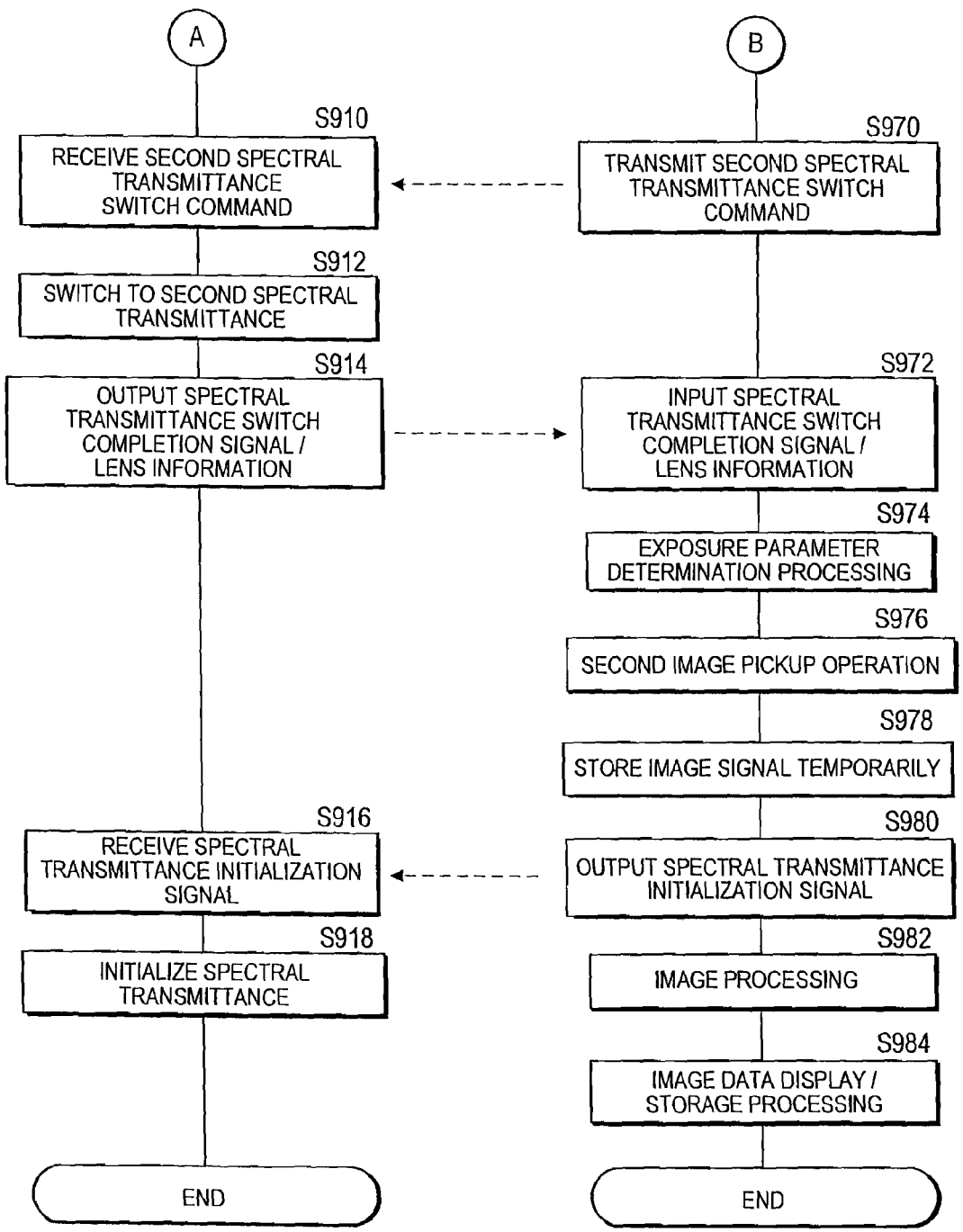

Referring to FIGS. 9A and 9B, a processing procedure executed by the lens CPU 702 and the camera CPU 246 when multiband image pickup is performed using the camera 230A and photographing lens 700 shown in FIG. 7 will be described. In FIGS. 9A and 9B, a processing procedure executed by the lens CPU 702 is shown on the left side, and a processing procedure executed by the camera CPU 246 is shown on the right side. In the flowcharts, the manner in which information transmitted between the two CPUs 702, 246 is indicated by broken line arrows. The flowcharts in FIGS. 9A and 9B show processing procedures that are executed when the photographing lens 700 is attached to the camera 230A and a recording mode (image pickup mode) is set after the power of the camera 230A is turned on. In actuality, photometry, focus adjustment and so on are also performed, but to facilitate understanding of this invention, these processing procedures have been omitted.

Further, the flowcharts shown in FIGS. 9A and 9B show an example in which the user selects the multiband image pickup mode such that image pickup is performed twice using a first spectral transmittance and a second spectral transmittance, from among the plurality of spectral transmittances that can be switched by the optical filter switching unit 708.

In S950, the camera CPU 246 transmits an activation signal to the lens CPU 702 and waits for a response from the lens CPU 702. In S900, the lens CPU 702 receives the activation signal output by the camera CPU 246, and transmits an operation preparation completion signal to the camera CPU 246. As a result of this processing performed by the camera CPU 246 and the lens CPU 702, a handshake is completed between the two CPUs.

In S902, the lens CPU 702 outputs the switchable spectral transmittance information to the camera CPU 246. The camera CPU 246 receives the switchable spectral transmittance information in S952. In S954, the camera CPU 246 performs processing to receive a multiband image pickup mode setting. In this multiband image pickup mode setting reception processing, the menu screen 800 shown in FIG. 8A is displayed on the monitor unit 250, and a user operation to select one of the choices 802 to 808 is received.

Next, in S956, the camera CPU 246 performs processing to receive a required image pickup time setting. More specifically, the image pickup completion time setting portion 810 and the image pickup completion time display/setting portion 812 are displayed on the menu screen 800, and an "OK" operation or an image pickup completion time modification operation performed by the user is received.

In S958, the camera CPU 246 outputs a first spectral transmittance switch command to the lens CPU 702. The lens CPU 702 receives the command in S904. In S906, the lens CPU 702 outputs a control signal to the driver 710 to have the optical filter switching unit 708 switch the filter spectral transmittance to the first spectral transmittance.

In S908, the lens CPU 702 outputs a spectral transmittance switch completion signal and lens information to the camera CPU 246. The lens information output to the camera CPU 246 from the lens CPU 702 includes the lens total spectral transmittance information described above with reference to the FIG. 7, and exposure factor information.

In S960, the camera CPU 246 inputs the spectral transmittance switch completion signal and the lens information from the lens CPU 702, and stores the lens information in a predetermined area of the RAM 240. Next, in S962, the camera CPU 246 performs processing to receive a release operation performed by the user. In S964, the camera CPU 246 performs processing to determine the exposure parameters on the basis of the lens total spectral transmittance information and exposure factor information included in the lens information received from the lens CPU 702 in S960, and a photometry result relating to the object light. The exposure parameters include the aperture value set in the photographing lens 700, the equivalent ISO sensitivity of the imaging device 236, and the shutter speed.

In S966, the camera CPU 246 performs the first image pickup operation at the exposure parameters determined in S964. In S968, the camera CPU 246 temporarily stores a digital image signal output by the imaging device 236 in the RAM 240.

In S970, the camera CPU 246 outputs a second spectral transmittance switch command to the lens CPU 702. The lens CPU 702 receives the command in S910. In S912, the lens CPU 702 outputs a control signal to the driver 710 to have the optical filter switching unit 708 switch the filter spectral transmittance to the second spectral transmittance.

In S914, the lens CPU 702 outputs the spectral transmittance switch completion signal and the lens information to the camera CPU 246. In S972, the camera CPU 246 receives the spectral transmittance switch completion signal and the lens information from the lens CPU 702, and stores the lens information in a predetermined area of the RAM 240. In S974, the camera CPU 246 performs processing to determine the exposure parameters for the second image pickup operation. More specifically, the camera CPU 246 determines the aperture value set in the photographing lens 700, the equivalent ISO sensitivity of the imaging device 236, the shutter speed, etc. on the basis of the lens total spectral transmittance information and exposure factor information included in the lens information received from the lens CPU 702 in S972. It should be noted that during the processing of S974 for determining the exposure parameters, only the shutter speed is varied as required, whereas the set aperture value of the photographing lens 700 and the equivalent ISO sensitivity of the imaging device 236 preferably remain fixed throughout the plurality of image pickup operations so that color reproduction processing can be performed more rigorously.

In S976, the camera CPU 246 performs the second image pickup operation at the exposure parameters determined in S974. In S978, the camera CPU 246 temporarily stores a digital image signal output by the imaging device 236 in the RAM 240.

Next, in S980, the camera CPU 246 outputs a spectral transmittance initialization signal to the lens CPU 702. The lens CPU 702 receives the spectral transmittance initialization signal output by the camera CPU 246 in S916. Next, in S918, the lens CPU 702 outputs a control signal to the driver 710 to initialize the spectral transmittance of the optical filter switching unit 708, whereupon the processing performed by the lens CPU 702 during multiband image pickup is terminated.

In S982, the camera CPU 246 outputs a command signal to the image processing unit 238 to perform image processing on the digital image signals obtained in the two image pickup operations. The image processing unit 238 processes the image signals that are stored temporarily in the RAM 240 following the processing performed by the camera CPU 246 in S968 and S978, thereby generating 6-band image data, and stores the generated image data temporarily in the RAM 240. At this time, the image processing unit 238 processes the image signals using the lens total spectral transmittance information and exposure factor information included in the lens information that is stored temporarily in the RAM 240 following the processing performed by the camera CPU 246 in S960 and S972. A technique disclosed in the pamphlet of WO2005/04628, for example, may be used as the processing performed by the image processing unit 238 to generate multiband image data from a plurality of sets of 3-band image data.

In S984, the camera CPU 246 issues a control signal to the image processing unit 238 to display an image based on the image data generated as described above on the monitor unit 250 and store the image data in the image data storage unit 252, whereupon the processing performed by the camera CPU 246 during multiband image pickup is terminated.

Incidentally, when the filter unit 206 shown in FIG. 1, the filter units 402, 404 shown in FIG. 4, the filter switching devices 200A, 200B, 200C shown in FIG. 6, and the optical filter switching unit 708 shown in FIG. 7 include an interference filter or have a constitution such as that shown in FIG. 5, the spectral transmittance thereof varies according to the incident angle.

An example of this will now be described with reference to FIG. 10. FIG. 10A is a perspective view showing the manner in which light enters the filter 206A disposed on the front surface of the photographing lens 220. Light beams allocated reference symbols A, B, C, B', C' are shown as the object light that enters the filter 206A. Hereafter, the light rays allocated the reference symbols A, B, C, B', C' will be referred to as a light ray A, a light ray B, a light ray C, a light ray B', and a light ray C'.

FIG. 10B is a schematic diagram showing the manner in which the spectral transmittance varies in accordance with variation in the incident angle when light enters the filter, in which the abscissa shows wavelength (lambda) and the ordinate shows transmittance and sensitivity. In FIG. 10B, the spectral sensitivities of the B, G, R pixels constituting the imaging device of the camera are shown as curves allocated reference symbols B, G, R. It is assumed that in relation to a light ray having an incident angle of 0°, or in other words the light ray A in FIG. 10A, the spectral transmittance of the filter 206A is a rectangular waveform spectral transmittance, which is indicated by the reference symbol 1 in FIG. 10B.

In relation to oblique-incidence light rays (light rays that enter the filter 206A at an incident angle other than 0°) such as the light ray B and the light ray C, on the other hand, the spectral transmittance varies, for example to a rectangular waveform spectral transmittance allocated the reference symbol 2 in FIG. 10B. When the filter 206A is an interference filter, an identical spectral transmittance, for example the spectral transmittance allocated the reference symbol 2 in FIG. 10B, is obtained in relation to the light ray B and the light ray C, which have a mirror-symmetrical positional relationship when the optical axis of the photographing lens 220 is set as the axis of symmetry.

Further, when the filter 206A has a constitution such as that shown in FIG. 5A, the spectral transmittance varies as follows, for example. In relation to the light ray A shown in FIG. 10A, which advances parallel (at an incident angle of 0°) to the optical axis P of the photographing lens 220, the spectral transmittance allocated the reference symbol 1 in FIG. 10B is obtained. Further, in relation to the light ray B and the light ray C, which advance off-axis and enter the filter 206A obliquely (at an incident angle other than 0°), the spectral transmittance allocated the reference symbol 2 in FIG. 10B is obtained. Meanwhile, in relation to the light rays B' and C', which enter the filter 206A obliquely after advancing off-axis along a plane that includes the optical axis P and is orthogonal to a plane including the light rays A, B and C, as shown in FIG. 10A, a spectral transmittance allocated a reference symbol 3 in FIG. 10B is obtained.

In addition to the spectral transmittance variation described above, which occurs due to variation in the incident angle of the object light, the spectral transmittance may also vary according to the location of the filter through which the object light passes. This is mainly caused by unevenness in the film thickness of a thin film formed on the filter.

Moreover, the object light that enters the imaging device after passing through the photographing lens may be affected by vignetting caused by the lens barrel or the cosine fourth power rule, depending on the image height, leading to a reduction in the light amount at the peripheries. Furthermore, when the photographing lens is of non-telecentric type on the image side, the amount of light impinging on light-receiving portions of the pixels constituting the imaging device may decrease at peripheral portions of the image surface.

When a filter with which the spectral transmittance varies according to the incident angle of the object light impinging on the filter, such as that described above, is used, when the spectral transmittance varies according to the location of the filter surface through which the object light passes, or when the photographing lens is constituted such that a reduction in the light amount at the peripheries and/or a reduction in the amount of light impinging on the light-receiving portions of the imaging device at the peripheries is likely to occur, these variations are preferably corrected to realize more faithful color reproduction.

The following method may be used as a method of correcting these variations. Instead of applying uniform correction to the respective image signals output from the pixels of the imaging device, a plurality of correction coefficients corresponding to pixel positions may be prepared in advance, and the image signals output from the respective pixels may be corrected using the corresponding correction coefficient. In this case, a correction coefficient may be prepared for each pixel, but in so doing, a large amount of time may be required for the correction processing. As a method of reducing the time required for the correction processing, an image area (the image area on the image forming plane of the photographing lens) may be divided into a plurality of areas, whereupon filter spectral transmittance information and lens spectral transmittance information such as that described above, for example, is prepared in relation to each of the divided plurality of areas. Alternatively, lens total spectral transmittance information may be prepared in relation to each of the divided plurality of areas.

FIG. 10C shows an outline of the manner in which an image area 1000 of the imaging device is divided into m×n (m, n being arbitrary positive integers) areas and spectral transmittance information $T(1, 1), T(1, 2), \ldots, T(m, n)$ is prepared for each of the divided m×n areas. The size of each area may be equal or unequal. For example, the image area 1000 may be divided unequally such that a central part (in which the image height is comparatively low) includes comparatively larger areas and the peripheral part (in which the image height is comparatively higher) includes smaller areas than the central part. The spectral transmittance information $T(1, 1), T(1, 2), \ldots, T(m, n)$ may include the filter spectral transmittance information and the lens spectral transmittance information, or the lens total spectral transmittance information.

A case in which the photographing lens and camera are formed to be lens-replaceable was described above, but this invention may also be applied to a fixed lens camera. An example of this will now be described with reference to FIG. 11.

Figure 11:
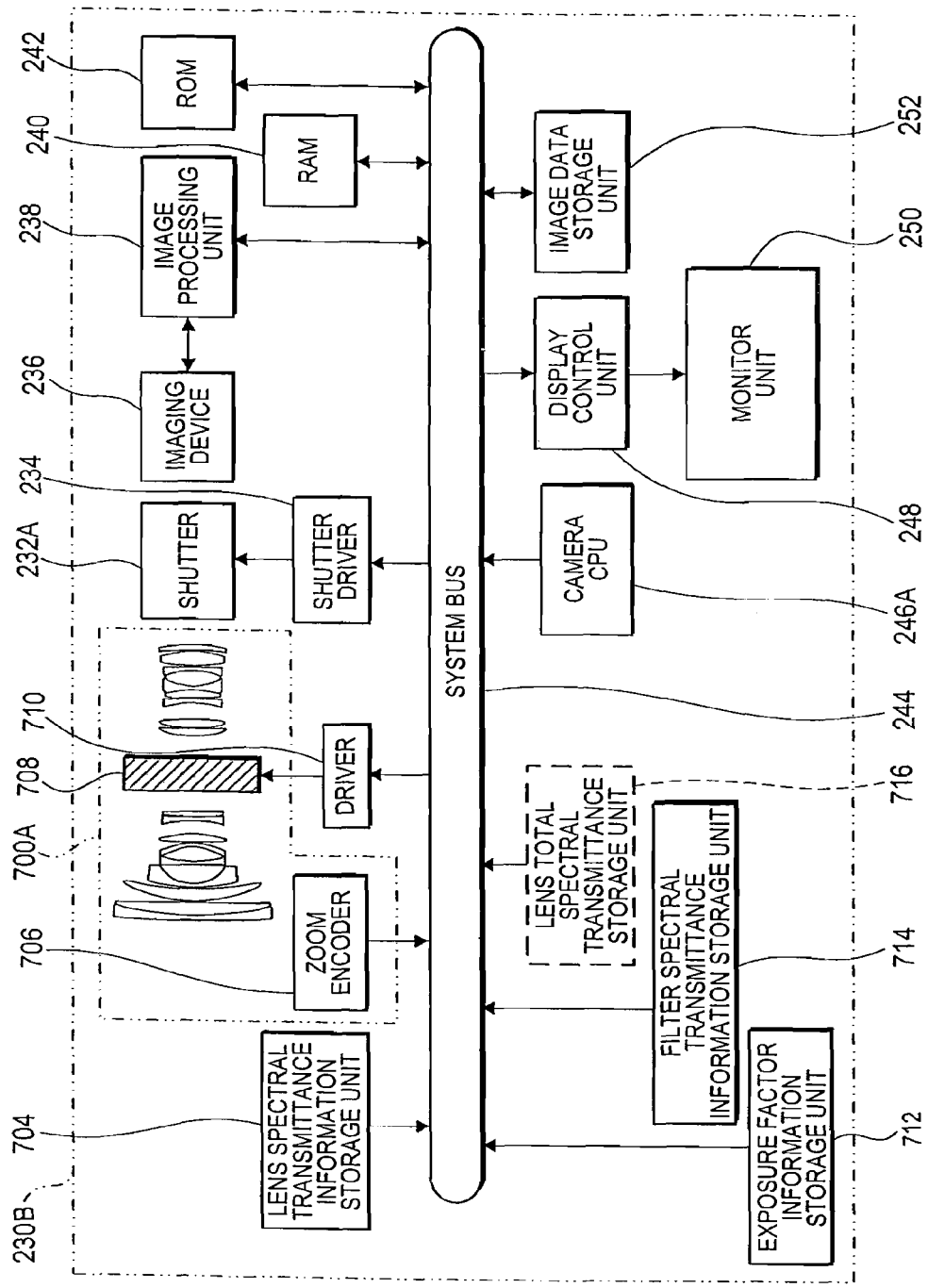
FIG. 11 is a block diagram illustrating an internal constitutional example of a camera having a fixed photographing lens when the filter switching device is built into the camera.
Figure 12A:
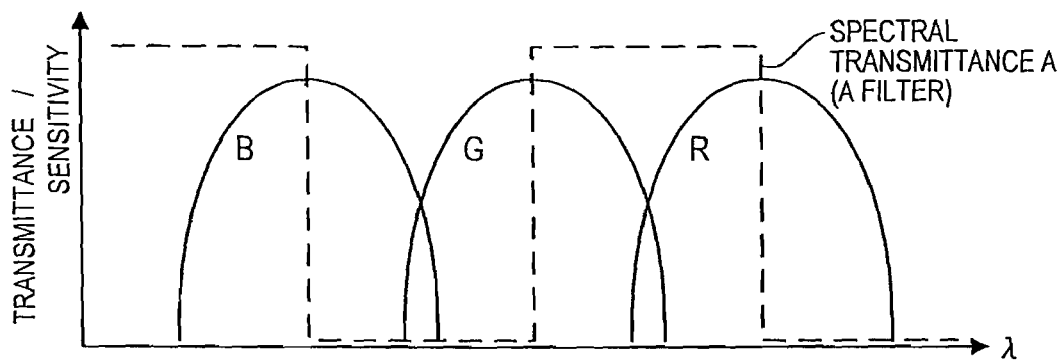
FIG. 12 is a view illustrating multiband image pickup according to a conventional technique, FIG. 12A showing a relationship between a spectral sensitivity characteristic on a photosensitive layer of each color of a photograph film and a spectral transmittance of an A filter, FIG. 12B showing a total spectral sensitivity characteristic obtained with the A filter and the photograph film, FIG. 12C showing a relationship between the spectral sensitivity characteristic on the photosensitive layer of each color of the photograph film and a spectral transmittance of a B filter, and FIG. 12D showing a total spectral sensitivity characteristic obtained with the B filter and the photograph film.
Figure 12B:
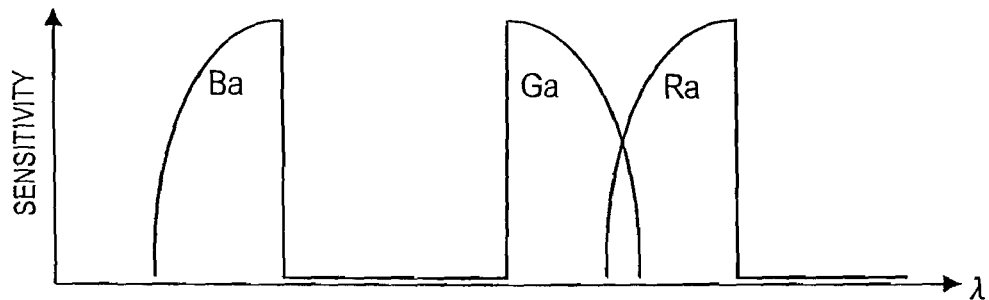
Figure 12C:
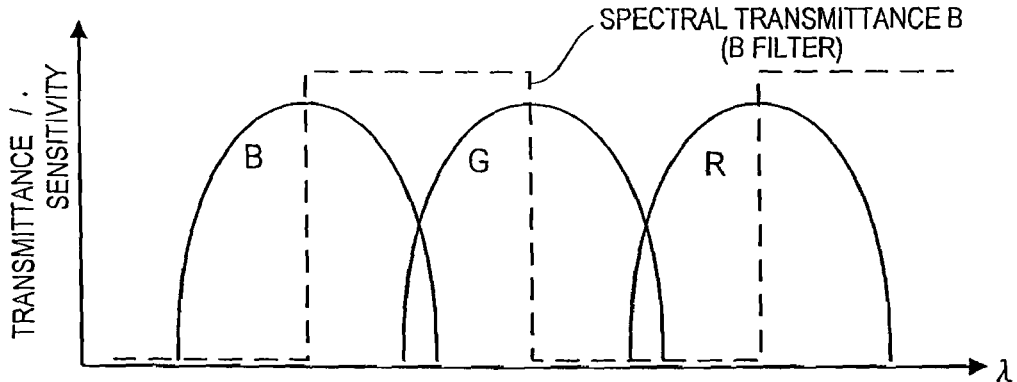
Figure 12D:
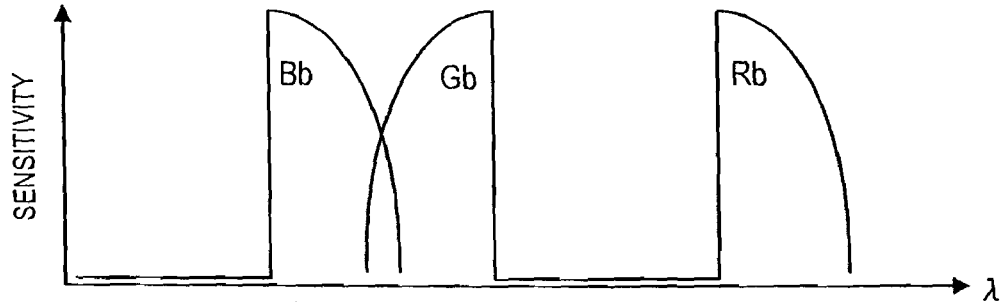

FIG. 11 is a schematic block diagram illustrating an internal circuit configuration of a fixed lens camera 230B. In FIG. 11, identical constitutional elements to those shown in FIG. 7 or FIG. 2 have been allocated identical reference symbols, and description thereof has been omitted. The following description will center on differences with FIG. 7.

A photographing lens unit 700A is a variable focal length optical system in which the focal length can be varied. The photographing lens unit 700A includes the zoom encoder 706 and the optical filter switching unit 708, and is fixed to the camera 230B. A signal corresponding to the established focal length of the photographing lens unit 700A is output from the zoom encoder 706.

The lens total spectral transmittance information storage unit 716, which may be provided in place of the lens spectral transmittance information storage unit 704 and the filter spectral transmittance information storage unit 714 included in the photographing lens 700 shown in FIG. 7, or a combination of the lens spectral transmittance information storage unit 704 and the filter spectral transmittance information storage unit 714, is provided in the camera 230B rather than the photographing lens unit 700A. Likewise, the exposure factor information storage unit 712 and the driver 710 are also provided in the camera 230B. In contrast to the constitution shown in FIG. 7, the lens CPU 702 provided in the photographing lens 700 shown in FIG. 7 is not provided in the camera 230B shown in FIG. 11, and the processing performed by the lens CPU 702 is all performed by a camera CPU 246A. In other words, the camera CPU 246A reads the information described above directly from the lens spectral transmittance information storage unit 704 and filter spectral transmittance information storage unit 714 or the lens total spectral transmittance information storage unit 716. The camera CPU 246A also switches the spectral transmittance of the optical filter switching unit 708 directly.

A shutter 232A provided in the camera 230B may be either a focal plane shutter or a lens shutter. When the shutter 232A is a lens shutter, the shutter 232A may be disposed in the vicinity of a diaphragm portion in the photographing lens unit 700A.

As described above, this invention may be implemented as a filter switching device that can be attached externally to a conventional camera system, a photographing lens having a built-in filter switching device, or a camera having a built-in filter switching device. In all cases, workability is improved during an operation to obtain a multiband image by performing image pickup a plurality of times while switching the spectral transmittance of the optical filter, and therefore, the need to input spectral transmittance information relating to the optical filter and so on during image processing can be eliminated, enabling an improvement in the operational efficiency of the image processing.

Examples in which multiband image data are generated in the camera were described above, but multiband image data may be generated by performing image processing in a separate information processing device to the camera, for example a computer or the like. In this case, either a combination of the spectral transmittance information of the optical filter used during image pickup and the spectral transmittance information of the photographing lens used during image pickup or the lens total spectral transmittance information can be stored together with the plurality of sets of 3-band image data generated in the plurality of image pickup operations. Alternatively, information from which the combination of the spectral transmittance information of the optical filter used during image pickup and spectral transmittance information of the photographing lens used during image pickup, or the lens total spectral transmittance information can be identified may be stored together with the plurality of sets of 3-band image data.

Examples in which the filter switching device is disposed on the front side (incident side), interior (in the vicinity of the diaphragm), and rear side (exit side) of the photographing lens were described above, but this invention is not limited to these examples. For example, the invention may also be applied to a case in which image pickup is performed using illumination light, such as studio photography or photography in a dark location. An example of this will be described below.

Figure 13:
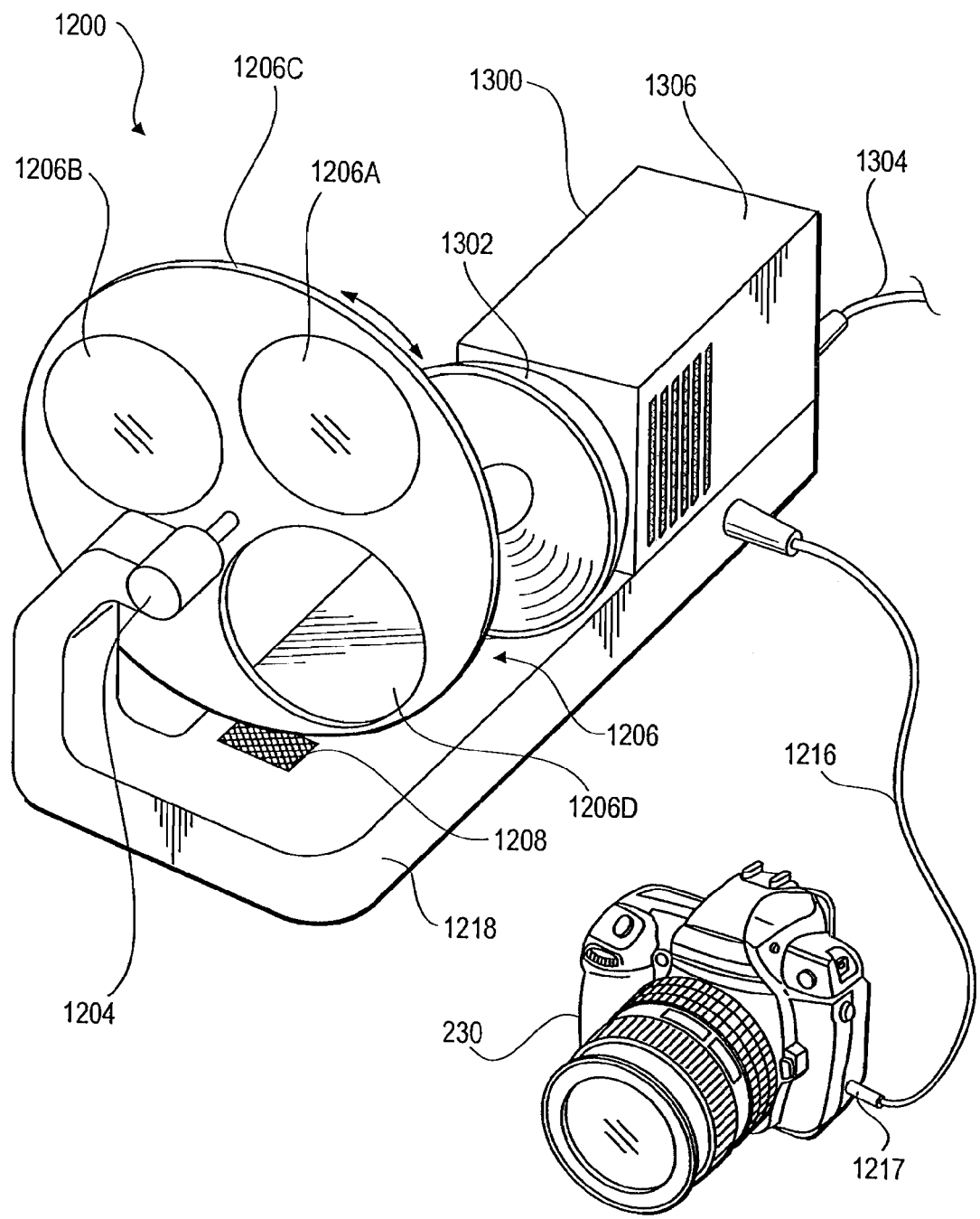
FIG. 13 is a perspective view illustrating an example in which the filter switching device is attached to an illumination light source.

FIG. 13 is a perspective view showing an example in which a filter switching device 1200 according to an embodiment of this invention is used together with the camera 230 and an illumination light source 1300. In the example shown in FIG. 13, the camera 230 may have an identical constitution to that described above with reference to FIG. 1.

The illumination light source 1300 may employ a tungsten lamp, a halogen lamp, an arc discharge type lamp, an LED, or the like, which is capable of emitting stationary light. Alternatively, the illumination light source 1300 may be a flash device that emits a flash using a xenon tube. When the illumination light source 1300 is a flash device, communication is performed between the camera 230 and the illumination light source 1300 in a wired or wireless form such that the illumination light source 1300 performs a flash operation in synchronization with an opening timing of a shutter provided in the camera 230. In the following description, it is assumed that the illumination light source 1300 is of a type that emits stationary light.

The illumination light source 1300 includes a light emission unit 1302 that emits stationary light, a power cable 1304, and a main body unit 1306.

The filter switching device 1200 includes a motor 1204, one end side of which is fixed to another end side of a base portion 1218 that can be fastened to the illumination light source 1300, a filter unit 1206, and a sensor unit 1208. The filter unit 1206 includes a disc 1206C that is driven to rotate by the motor 1204, and a plurality of filters 1206A, 1206B disposed in substantially equidistant positions from a rotary center of the disc 1206C. An opening portion 1206D is provided in the disc 1206C. By having the motor 1204 rotate the disc 1206C and then stop it in a predetermined angular position, the opening portion 1206D or one of the filters 1206A, 1206B can be positioned on an optical path of illumination light emitted from the light emission unit 1302 toward an object.

In FIG. 13, only two filters 1206A, 1206B are shown, but three or more filters, or a single filter, may be provided. When only one filter is provided, the disc 1206C may be omitted, and in its place, a rocker mechanism or a linear motion mechanism that can insert or remove the filter into or from the optical path of the illumination light emitted from the light emission unit 1302 toward the object may be used.

Further, a substantially colorless transparent optical member formed from glass, resin, or the like may be disposed in the opening portion 1206D. Moreover, the filter unit 206 does not necessarily have to include an opening portion or a colorless transparent filter.

The sensor unit 1208 is provided in the base unit 1218 in a position close to an outer edge of the disc 1206C. The sensor unit 1208 may employ an optical sensor, a Hall sensor, or another type of sensor. The sensor unit 1208 is provided to detect the angular position of the disc 1206C and thereby detect whether the opening portion 1206D, the filter 1206A, or the filter 1206B is positioned on the optical path of the illumination light emitted from the light emission unit 1302 toward the object. When the sensor unit 1208 employs an optical sensor, a so-called photoreflector type optical sensor may be used. In this case, a predetermined reflective/nonreflective pattern is formed on an outer peripheral part of the disc 1206C, and by detecting a signal pattern output from the sensor unit 1208, the angular position of the disc 1206C is detected, whereby the type of the filter that is positioned on the optical path of the illumination light emitted from the light emission unit 1302 toward the object can be specified. Similarly, by disposing a magnetic body on the outer edge part of the disc 1206C, the angular position of the disc 1206C can be specified by a Hall sensor or the like. It should be noted that when the motor 1204 has an inbuilt encoder, the sensor unit 1208 may be omitted.

A connection cable 1216 electrically connects the camera 230 to the filter switching device 1200 such that a control signal, information, and so on, to be described below, can be exchanged. By connecting a plug 1217 provided on a tip end part of the connection cable 1216 to the receptacle 260 (FIG. 1) provided in the camera 230, control signals and information can be exchanged between the camera 230 and the filter switching device 1200.

Figure 14:
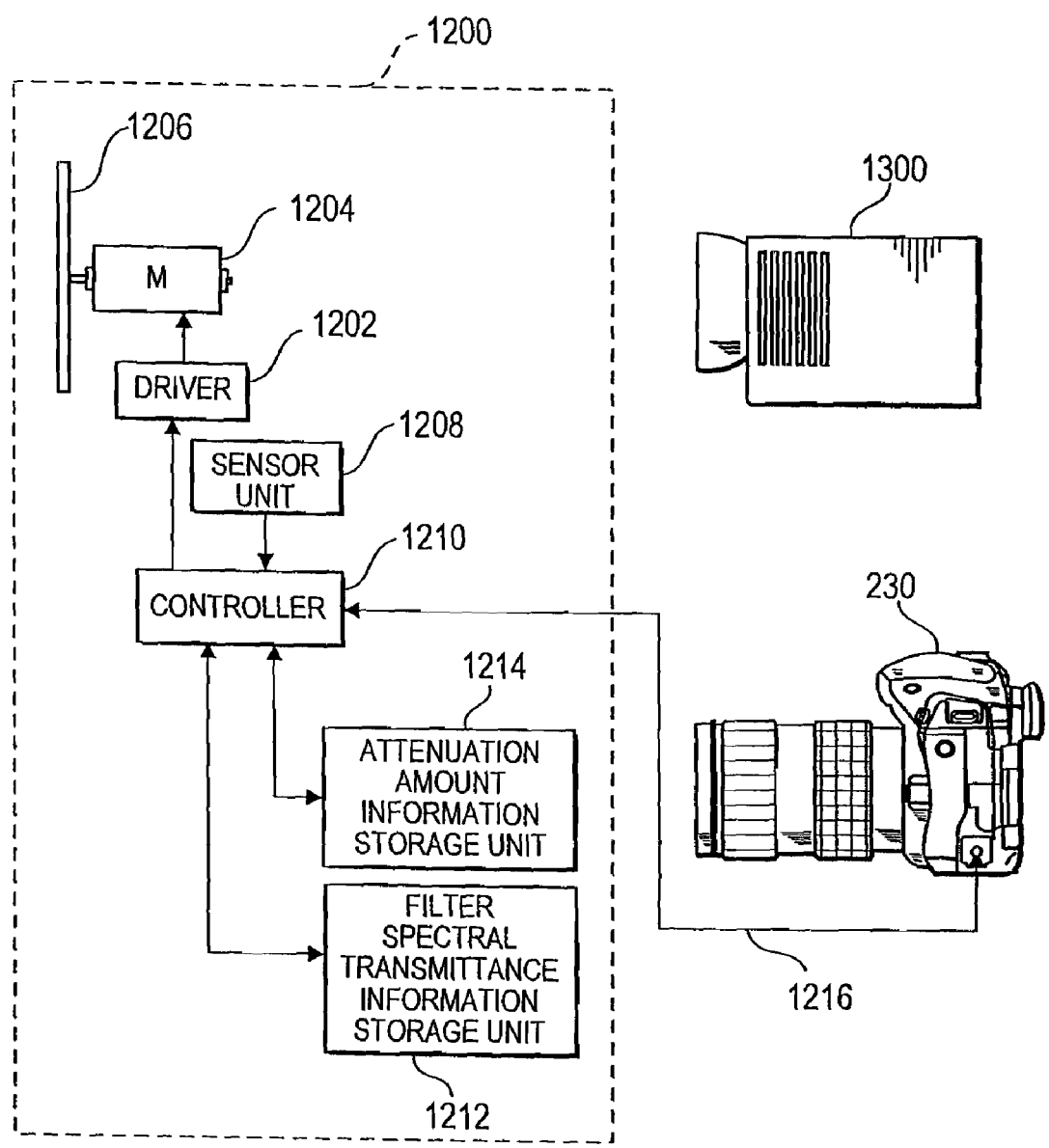
FIG. 14 is a block diagram illustrating an internal constitutional example of the filter switching device attached to the illumination light source.

Referring to FIG. 14, which is a schematic block diagram illustrating an internal circuit configuration of the filter switching device 1200, the internal constitution of the filter switching device 1200 will be described.

The filter switching device 1200 includes a driver 1202 that supplies power to the motor 1204 for driving the disc 1206C to rotate, the sensor unit 1208, a controller 1210, a light attenuation amount information storage unit 1214, and a filter spectral transmittance information storage unit 1212. The motor 1204 and the sensor unit 1208 are constituted as described above with reference to FIG. 13. The controller 1210 is constituted by a single-chip microcomputer, a logic circuit, or similar.

Information relating to light attenuation amounts corresponding respectively to the filters 1206A, 1206B is stored in the light attenuation amount information storage unit 1214. An inverse (2, 3, for example) of a light amount ratio (1/2, 1/3, for example) after the emitted light from the light emission unit 1300 is attenuated when the illumination light passes through the respective filters 1206A, 1206B may be used as the information relating to the light attenuation amount. When image pickup is performed using the filters 1206A, 1206B, a focal plane exposure amount that is substantially identical regardless of whether a filter is used or not can be obtained by applying an exposure amount obtained by multiplying the light attenuation amount to the exposure amount when the filter is not used. Alternatively, when the amount of light emitted from the illumination light source 1300 is variable, the light amount may be adjusted in accordance with the light attenuation amount such that the brightness of the object is regulated.

It should be noted that the filters 1206A, 1206B differ from a so-called ND filter in having wavelength-dependent transmittance. The information stored in the light attenuation amount information storage unit 1214 is preferably information relating to a light attenuation amount determined on the basis of a spectral transmittance in a wavelength band intended to allow the passage of light.

Alternatively, information relating to the spectral transmittances of the filters 1206A, 1206B may be stored in the light attenuation amount information storage unit 1214 such that the camera CPU 246 determines the light attenuation amount upon reception of this information.

Information relating to spectral transmittance corresponding respectively to the filters 1206A, 1206B is stored in the filter spectral transmittance information storage unit 1212. The information relating to the filter spectral transmittance may include transmittances at wavelengths intervals of a 1 nm pitch, a 2 nm pitch, a 5 nm pitch, and a 10 nm pitch, for example, within a wavelength range of 380 nm to 780 nm. Alternatively, the filter spectral transmittance information storage unit 1212 may store only filter identification information enabling identification of the types of the filters 1206A, 1206B. In this case, information relating to the filter spectral transmittance may be stored in the camera 230 such that when the camera 230 receives the filter spectral transmission identification information from the filter switching device 1200, information relating to the filter spectral transmittance corresponding to the received information is retrieved. Further, switchable spectral transmittance information, from which a plurality of spectral transmittances that can be switched by the filter switching device 1200 can be specified, is also stored in the filter spectral transmittance information storage unit 1212. The switchable spectral transmittance information is referenced by the camera 230 when the camera 230 is set in the multiband image pickup mode.

The controller 1210 receives a signal indicating a spectral transmittance from the camera 230 via the connection cable 1216. The controller 1210 executes a spectral transmittance switching operation by driving the motor 1204 via the driver 1202 while detecting the signal output from the sensor unit 1208 such that the filter having the desired spectral transmittance is positioned on the optical path of the illumination light emitted from the light emission unit 1302 toward the object. The controller 1210 then reads the information relating to the light attenuation amount and the information relating to the filter spectral characteristic corresponding to the filter positioned on the image pickup optical path from the light attenuation amount information storage unit 1214 and the filter spectral transmittance information storage unit 1212, and outputs this information to the camera 230.

In addition to the so-called turret type constitution described above with reference to FIGS. 13 and 14, in which the filters 1206A, 1206B and the opening portion 1206D can be switched, the filter switching device 1200 may be constituted such that the spectral transmittance can be switched electrically using a polarization modulator, as described above with reference to FIGS. 5 and 6.

The filter switching device 1200 may have a built-in battery as a power source, or may be supplied with power from the camera via the connection cable 1216. Alternatively, power may be supplied to the filter switching device 1200 from an external power supply device via a separate cable.

Figure 15:
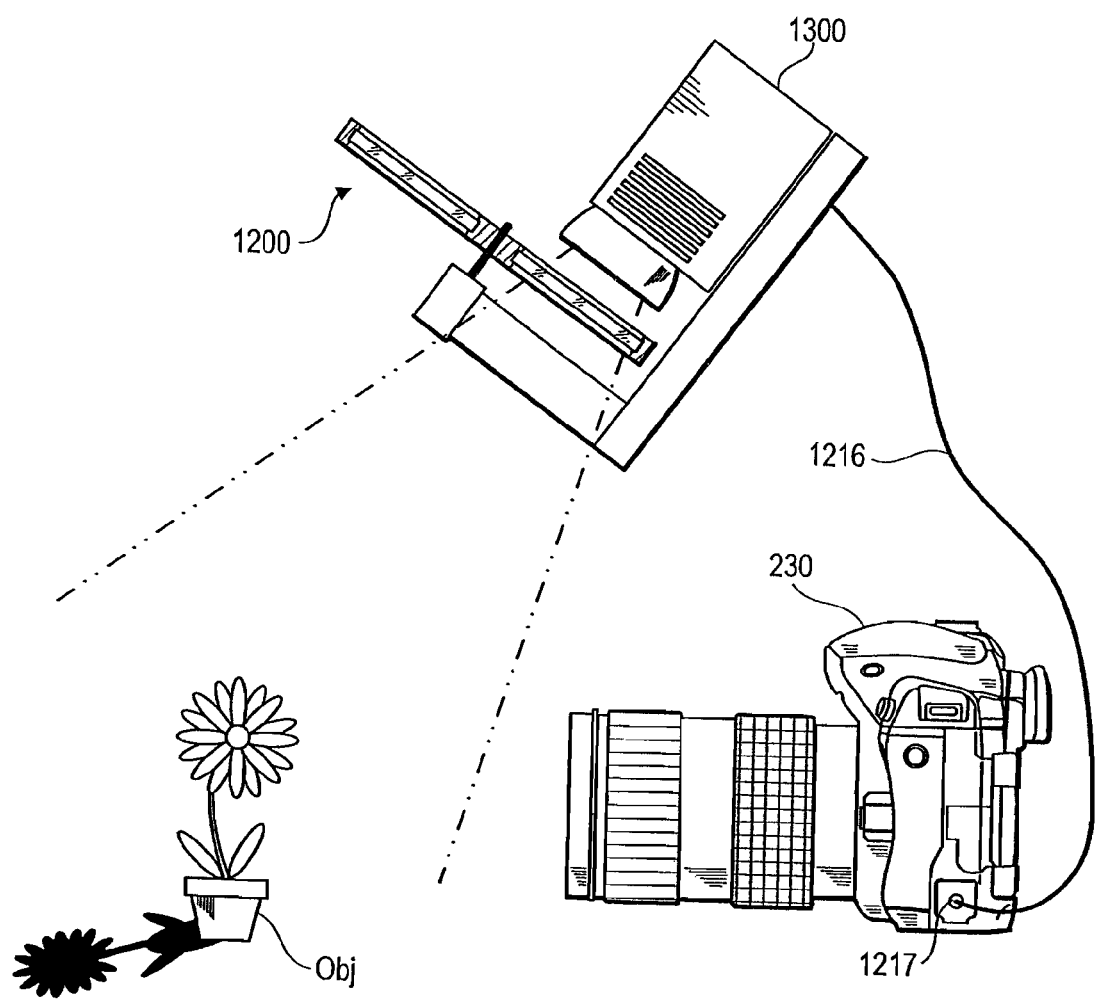
FIG. 15 is a view illustrating the manner in which image pickup is performed using an image pickup system constituted by the illumination light source, the filter switching device attached to the illumination light source, and the camera.

FIG. 15 is a pattern diagram depicting the manner in which an object Obj illuminated by the illumination light source 1300 is photographed by the camera 230. The illumination light source 1300 and the filter switching device 1200 are fixed to a tripod, a stand, or the like. The filter switching device 1200 and the camera 230 are connected via the connection cable 1216 such that when power is supplied to the camera 230, communication is performed between the two. The light attenuation amount information and filter spectral transmittance information are output to the camera 230 from the filter switching device 1200.

When the user opens the multiband image pickup mode setting menu, a menu screen such as that described above with reference to FIG. 8A is displayed on the monitor unit 250. The user selects the desired image pickup mode from the choices displayed on the monitor unit 250, and the selection made by the user is received by the camera 230. Then, in accordance with the received image pickup mode, a multiband image pickup sequence such as that described above with reference to FIG. 8B is executed. At this time, the filter switching device 1200 switches the filters 1206A, 1206B and the opening portion 1206D in synchronization with a plurality of exposure operations. As a result, the object Obj is illuminated by illumination light having different spectral characteristics during the plurality of exposure operations.

In the example described above with reference to FIGS. 13 to 15, a filter is disposed on the optical path of the illumination light emitted from the illumination light source 1300 instead of the optical path of a photographing optical system. In this type of constitution, the optical performance (surface accuracy, degree of parallelization, birefringence, striae, and so on) required of the filter is comparatively low. The reason for this is that, in contrast to a case in which the filter is incorporated into a photographing lens, the optical performance of the filter does not affect the optical performance of the photographing lens. Therefore, the cost of the optical material used in the filter switching device 1200 is comparatively low, and accordingly, the filter switching device 1200 can be constructed at a comparatively low cost.

Incidentally, when the filter 1206A, 1206B is an interference filter or an absorbing filter, or a filter employing a polarization modulator such as that described with reference to FIG. 5, the spectral transmittance exhibits incident angle dependence, as explained above. Therefore, the spectral characteristic of the illumination light that passes through the filter 1206A, 1206B and illuminates the object may vary near the center and the peripheries of the illumination area. In this specification, this phenomenon will be referred to as illumination color unevenness (color unevenness).

Figure 16:
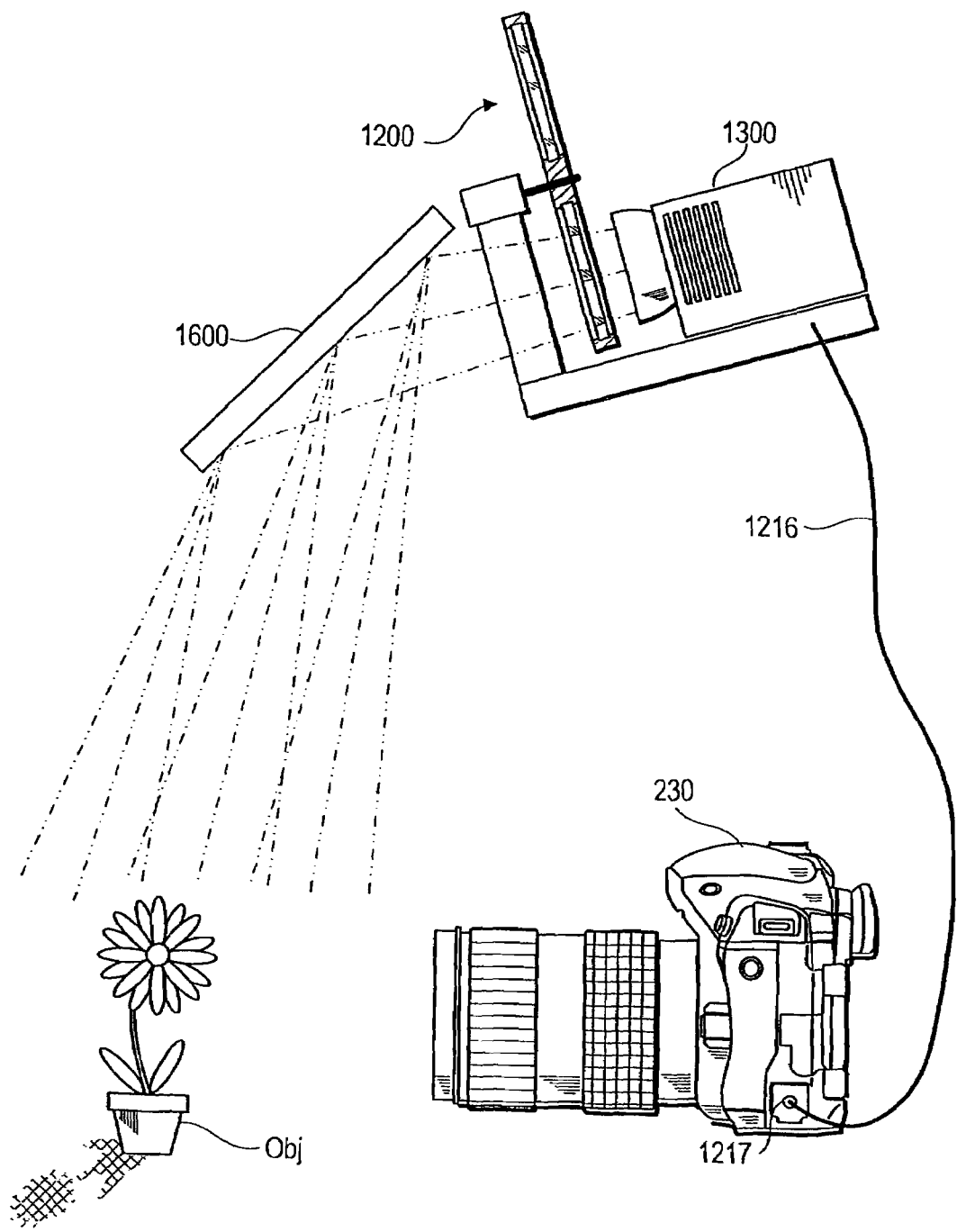
FIG. 16 is a view illustrating the manner in which image pickup is performed using the image pickup system constituted by the illumination light source, the filter switching device attached to the illumination light source, and the camera, and a reflection type diffuser plate.

When illumination color unevenness poses a problem, a constitution such as that shown in FIG. 16 is effective. FIG. 16 is a view depicting a state in which illumination light emitted from the illumination light source 1300 passes through the filter 1206A, 1206B or the opening portion 1206D and is diffused by a diffuser plate 1600 before reaching the object Obj. In the state shown in FIG. 16, the illumination light that passes through the filter 1206A, 1206B or the opening portion 1206D is reflected and diffused by the diffuser plate (reflecting plate), and therefore the effect of the illumination color unevenness described above can be reduced. More specifically, a central beam and a peripheral beam of the luminous flux of the illumination light emitted from the illumination light source 1300 are both diffused by the diffuser plate 1600 so as to be interdiffused substantially evenly, and as a result, the effect of illumination color unevenness can be reduced.

In the constitution shown in FIG. 16, the illumination light that reaches the object Obj is diffused light, and therefore a shadow generated in the object Obj can be weakened. Furthermore, illumination light emitted from the illumination light source 1300 at a small emission angle can be used, and therefore the aperture of the filter 1206A, 1206B can be reduced, enabling a reduction in the size of the filter switching device 1200.

In the examples described above with reference to FIGS. 13 to 16, information relating to the spectral characteristic (spectral radiance characteristic) of the illumination light source 1300 is preferably input into the camera 230 in advance to improve the accuracy of color reproduction.

Figure 17:
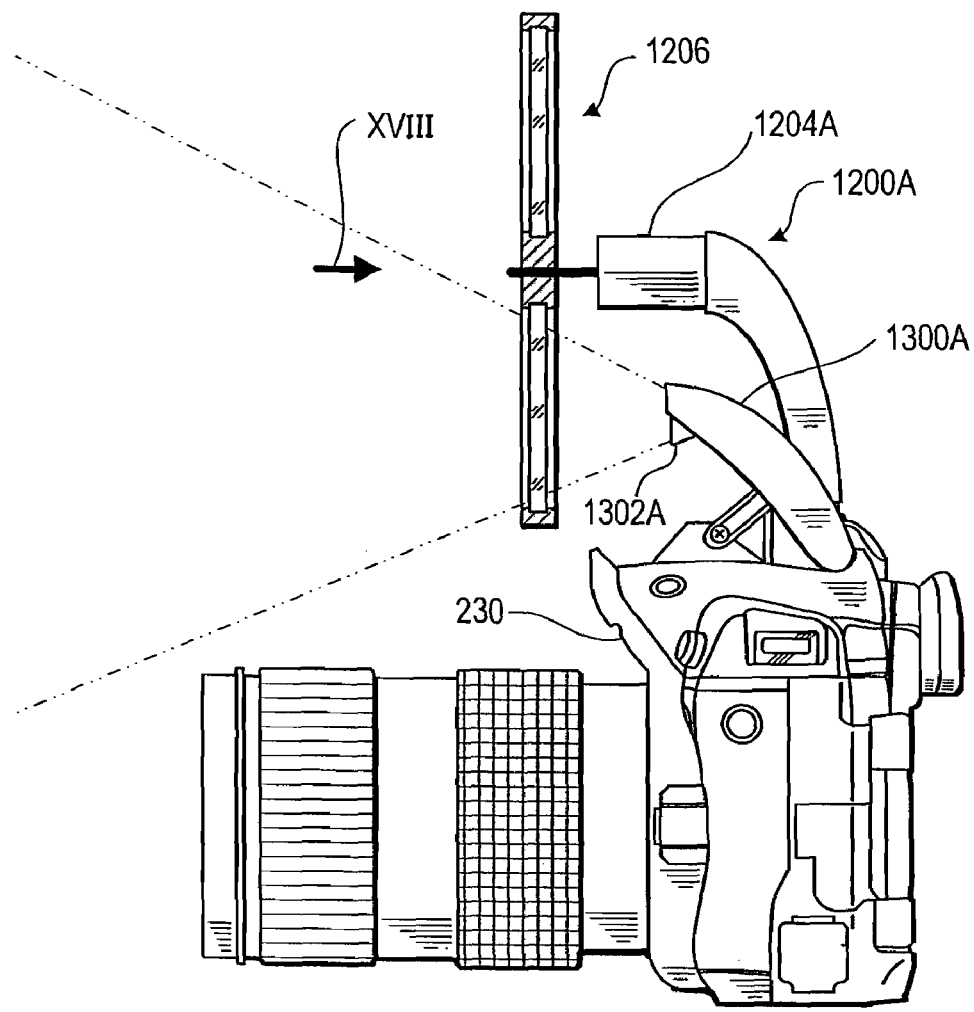
FIG. 17 is a view illustrating an example in which the illumination light source is a flash device built into a camera and the filter switching device is attached to the camera.

FIG. 17 is a view illustrating an example in which a filter switching device 1200A is used together with a flash device 1300A of the camera 230. In FIG. 17, the flash device 1300A is shown to be installed in the camera 230 and provided on a top cover of the camera. In this case, the spectral characteristic of the flash device 1300A may be recorded in the ROM 242 (FIG. 2) of the camera 230 in advance. The flash device 1300A may also be attached externally, for example in a clip-on manner. In this case, communication may be performed between the flash device 1300A and the camera 230 such that the information relating to the spectral characteristic of the flash device 1300A is output to the camera 230 from the flash device 1300A.

As shown in FIG. 17, when the flash device 1300A is installed in the camera, the filter switching device 1200A may be attached to an accessory shoe, another connector, or the like provided on the top cover of the camera 230. In this case, the filter switching device 1200A and the camera 230 may communicate with each other via an electric contact provided on the accessory shoe or the other connector. The filter switching device 1200A may have an inbuilt power supply or receive power from the camera 230. It should be noted that the filter switching device 1200A is assumed to have an identical internal constitution to that described above with reference to FIG. 14.

When the flash device 1300A is externally attached, the filter switching device 1200A and the flash device 1300A may be connected to each other mechanically and electrically. The filter switching device 1200A includes a motor 1204A and the filter unit 1206.

Figure 18:
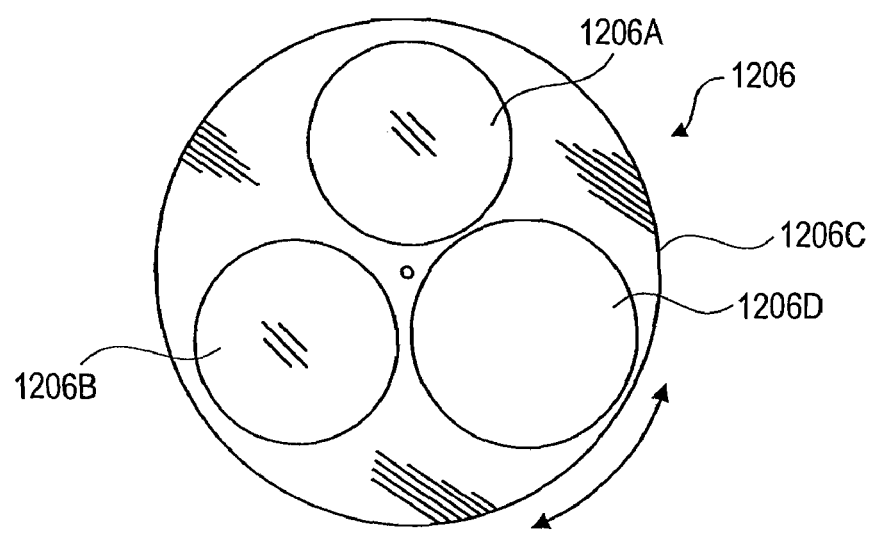
FIG. 18 is a view illustrating the filter unit from the direction of an arrow XVIII in FIG. 17.

FIG. 18 is a view showing the filter unit 1206 from the direction of an arrow XVIII in FIG. 17. Of the constitutional elements of the filter switching device 1200A shown in FIGS. 17 and 18, those having an identical constitution to the elements described with reference to FIG. 13 have been allocated identical reference symbols, and description thereof has been omitted.

The motor 1204A includes an inbuilt encoder, and the controller 1210 is constituted to be capable of detecting which of the filters 1206A, 1206B and the opening portion 1206D is positioned on the optical path of the illumination light emitted from a light emission unit 1302A of the flash device 1300A.

In the constitution described with reference to FIGS. 17 and 18, the surface area of the light emission unit 1302A of the flash device 1300 can be made comparatively small, and therefore the size of the filter unit 1206 can be reduced.

When the filter 1206A, 1206B is an interference filter or an absorbing filter, or a filter employing the constitution described with reference to FIG. 5, illumination color unevenness may occur, as described above. In this case, the constitution shown in FIG. 19, for example, is preferably employed.

Figure 19:
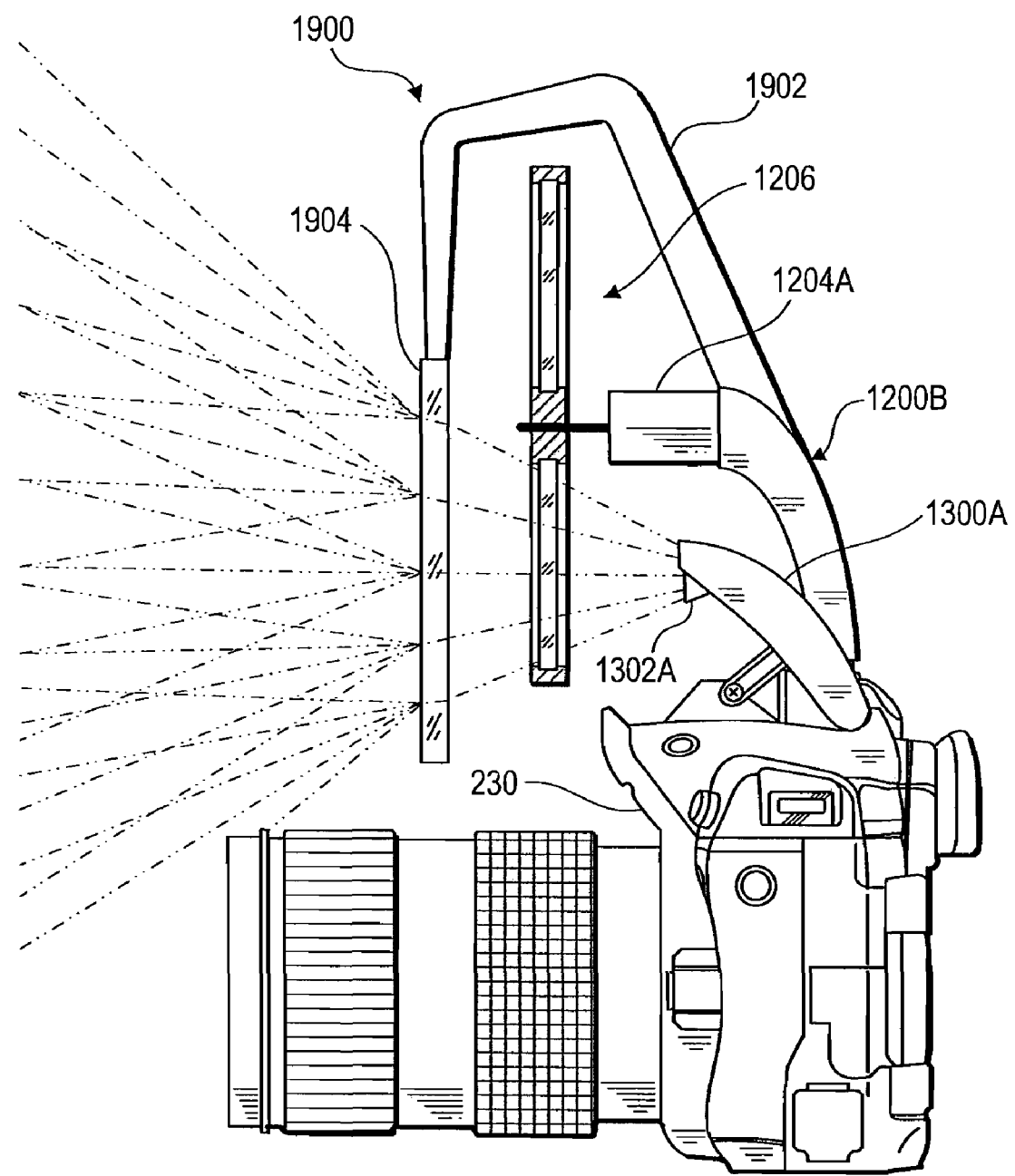
FIG. 19 is a view illustrating an example in which the illumination light source is a flash device built into a camera and a filter switching device having a diffuser plate is attached to the camera.

FIG. 19 is a view showing an example in which a light diffusion unit 1900 is provided in addition to the constitution shown in FIG. 17. The light diffusion unit 1900 includes a suspension portion 1902 and a diffuser plate 1904. One end of the suspension portion 1902 is attached to a filter switching device 1200B, and the diffuser plate 1904 is attached to the other end. Thus, the diffuser plate 1904 is supported by the suspension portion 1902. Light emitted from the light emission unit 1302A of the flash device 1300A is diffused by the diffuser plate 1904. Hence, even when the filter unit 1206 includes a filter having a characteristic according to which illumination color unevenness occurs easily, the effect of the illumination color unevenness can be reduced by the light diffusion action of the diffuser plate 1904. The diffuser plate 1904 may be formed by dispersing a semi-opaque light diffusing substance through the interior of a transparent substrate made of glass, acrylic, or the like, or may be formed by forming the surface (one or both surfaces) of a transparent substrate as a ground glass surface, a fly-eye lens surface, or a crystal cut surface.

By providing the light diffusion unit 1900, the effect of illumination color unevenness can be reduced, as described above, and moreover, an illumination angle that is suitable to a photographing lens having a shorter focal length (a wider angle) can be obtained.

Figure 20A:
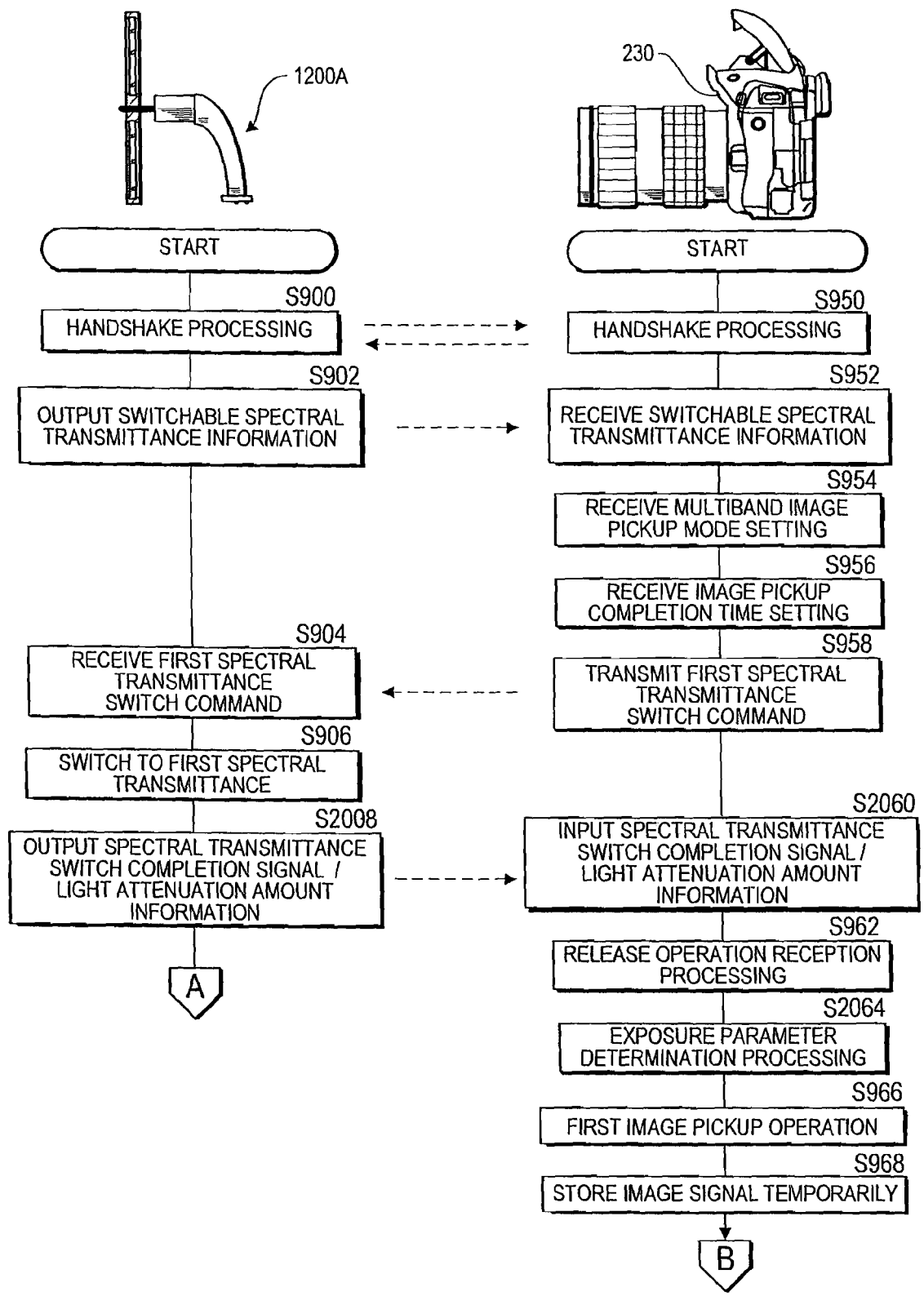
FIG. 20 is a flowchart illustrating a multiband image pickup procedure executed by a controller provided in the filter switching device and the internal CPU of the camera, both shown in FIG. 17.
Figure 20B:
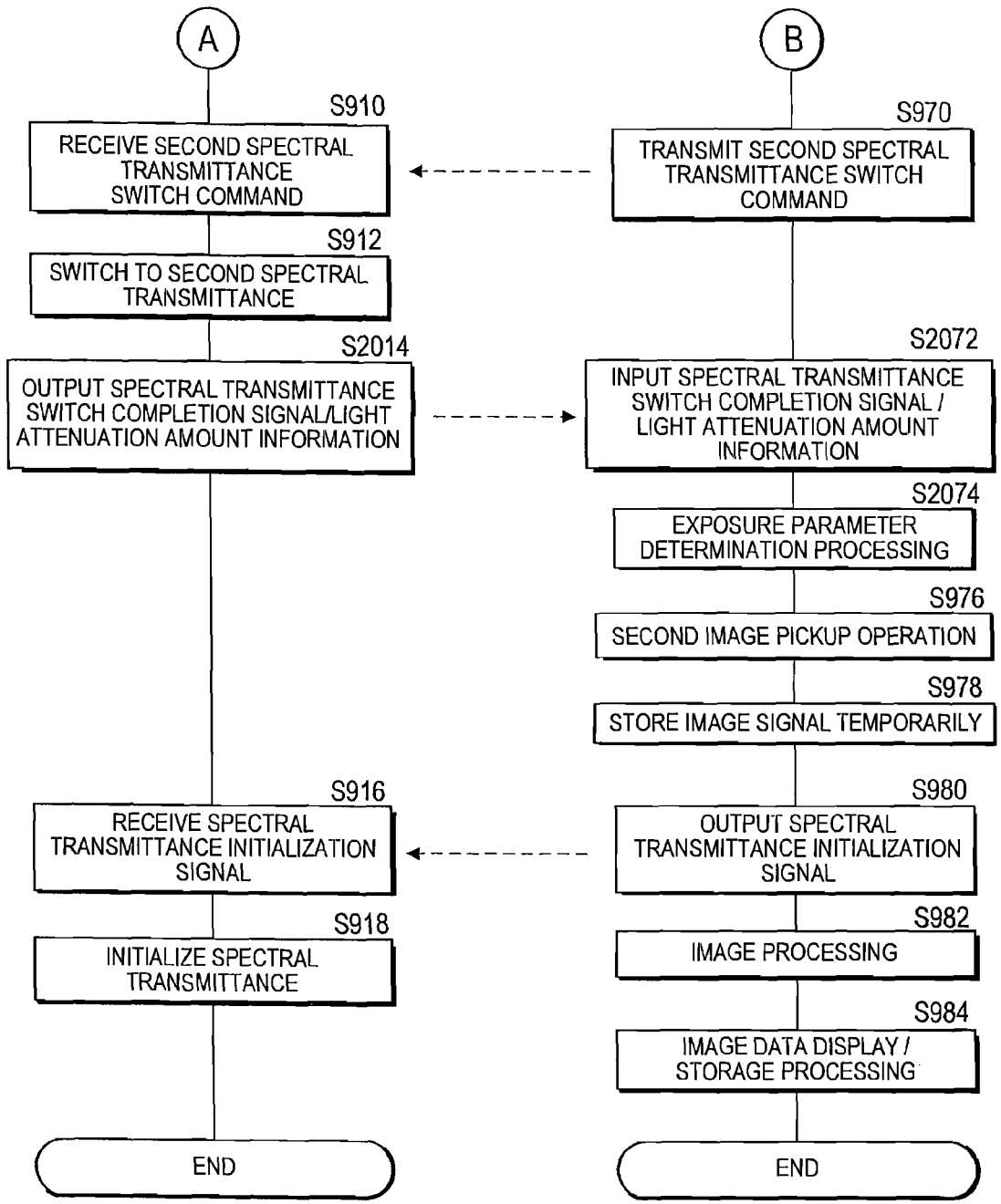

Referring to FIGS. 20A and 20B, a processing procedure executed by the camera CPU 246 and the controller 1210 when multiband image pickup is performed using the filter switching device 1200A, flash device 1300A, and camera 230 provided in the manner shown in FIG. 17 will now be described.

In the flowcharts shown in FIGS. 20A and 20B, identical processing procedures to those of the processing shown in the flowcharts of FIGS. 9A and 9B have been allocated identical step numbers, and detailed description thereof has been omitted. The following description centers on differences with the processing procedures shown in the flowcharts of FIGS. 9A and 9B.

The processing procedure shown in the flowcharts of FIGS. 9A and 9B is executed by the lens CPU 222 and the camera CPU 246, whereas the processing procedure shown in the flowcharts of FIGS. 20A and 20B is executed by the controller 1210 provided in the filter switching device 1200A and the camera CPU 246.

The camera CPU 246 receives the switchable spectral transmittance information from the controller 1210 (S952), and receives the image pickup setting from the user (S954, S956). In S904, the controller 1210 receives the first spectral transmittance switch command issued by the camera CPU 246 in S958, whereupon the controller 1210 drives the motor 1204 to switch the spectral transmittance of the filter unit 206 to the first spectral transmittance (S906).

In S2008, the controller 1210 outputs a spectral transmittance completion signal to the camera CPU 246 together with the light attenuation amount information. The camera CPU 246 receives the signal and the information in S2060. In S962, the camera CPU 246 performs processing to receive the release operation performed by the user, and in S2064 performs exposure parameter determination processing. More specifically, the camera CPU 246 performs processing in S2064 to determine the exposure parameters listed below on the basis of the light attenuation amount information received from the controller 1210 in S2060. The exposure parameters include the aperture value set by the photographing lens, the equivalent ISO sensitivity of the imaging device 236, the shutter speed, and a light emission amount or a light control level of the flash device 1300A.

The camera CPU 246 performs the first image pickup operation at the exposure parameters determined in S2064 (S966), stores the image signal temporarily (S968), and then transmits the second spectral transmittance switch command (S970).

The controller 1210 receives the second spectral transmittance switch command (S910) and drives the motor 1204 to switch the spectral transmittance of the filter unit 206 to the second spectral transmittance (S912). In S2014, the controller 1210 outputs a spectral transmittance completion signal to the camera CPU 246 together with the light attenuation amount information. The camera CPU 246 inputs the signal and the information in S2072. In S2074, on the basis of the light attenuation amount information input in S2072, the camera CPU 246 performs similar processing to that performed in S2064.

The camera CPU 246 performs the second image pickup operation at the exposure parameters determined in S2074 (S976), stores the image signal temporarily (S978), and then outputs the spectral transmittance initialization signal (S980).

The controller 1210 receives the spectral transmittance initialization signal in S916 and performs spectral transmittance initialization processing in S918, whereupon the series of spectral transmittance switching processes is terminated.

In S982, the camera CPU 246 outputs a command signal to the image processing unit 238 to perform image processing on the image signals obtained in the two image pickup operations. The image processing unit 238 processes the image signals that are stored temporarily in the RAM 240 following the processing performed by the camera CPU 246 in S968 and S978, thereby generating 6-band image data, and stores the generated image data temporarily in the RAM 240.

In S984, the camera CPU 246 issues a control signal to the image processing unit 238 to display an image based on the image data generated as described above on the monitor unit 250 and store the image data in the image data storage unit 252, whereupon the processing accompanying multiband image pickup is terminated.

As described above, this invention may be applied to a camera system having a camera, an illumination light source, and a filter switching device. The filter switching device is disposed such that a filter is positioned on the optical path of the illumination light that is emitted from the illumination light source toward an object, and thus the spectral transmittance of the filter can be switched when image pickup is performed a plurality of times. Here, associations can be made easily between the image data that are obtained during each of the plurality of image pickup operations and information relating to the spectral transmittance of the optical filters that are switched during the respective image pickup operations, and therefore processing for generating multi-band image data can be performed smoothly.

This invention may also be applied to a filter switching device, a photographing lens, and so on used with an electronic still camera or a movie camera. Further, this invention may be applied to an electronic still camera, a movie camera, or an image input device.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

The entire contents of Japanese Patent Application JP2008-084503 (filed on Mar. 27, 2008), Japanese Patent Application (filed on Oct. 29, 2008), and International Application No. PCT/JP2004/016678 (filed on Nov. 10, 2004) are incorporated herein by reference.

What is claimed is:

1. A filter switching device comprising:
  an optical filter unit that is disposed on an optical path of an object light that passes through a photographing lens of a camera, and can be switched to any one of a plurality of spectral transmittances;
  a spectral transmittance switching unit that switches a spectral transmittance of the optical filter unit to one of the plurality of spectral transmittances;

a filter spectral transmittance information storage unit that stores filter spectral transmittance information, which is information relating to each of the plurality of spectral transmittances;

a filter spectral transmittance information output unit that outputs filter spectral transmittance information corresponding to the spectral transmittance of the optical filter unit to the camera when the spectral transmittance of the optical filter unit is switched; and an exposure factor information storage unit that stores exposure factor information, which is information relating to a filter exposure factor corresponding to each of the plurality of spectral transmittances, wherein the filter spectral transmittance information output unit outputs the exposure factor information to the camera in addition to the filter spectral transmittance information corresponding to the spectral transmittance switched by the spectral transmittance switching unit.

2. The filter switching device as defined in claim 1, wherein the optical filter unit includes at least one of an interference filter and an absorbing filter.

3. A filter switching device comprising:

an optical filter unit that is disposed on an optical path of an object light that passes through a photographing lens of a camera, and can be switched to any one of a plurality of spectral transmittances;

a spectral transmittance switching unit that switches a spectral transmittance of the optical filter unit to one of the plurality of spectral transmittances;

a filter spectral transmittance information storage unit that stores filter spectral transmittance information, which is information relating to each of the plurality of spectral transmittances; and a filter spectral transmittance information output unit that outputs filter spectral transmittance information corresponding to the spectral transmittance of the optical filter unit to the camera when the spectral transmittance of the optical filter unit is switched;

wherein the optical filter unit includes an electrically variable spectral characteristic filter having a polarizer that outputs input nonlinear polarized light as linear polarized light, a wavelength-selective polarization rotator that performs a wavelength-dependent polarization rotation action on the linear polarized light output from the polarizer, a polarization modulator that is capable of electrically modifying the polarization rotation action applied to the light passing through the wavelength-selective polarization modulator, and an analyzer through which only light having a predetermined polarization direction, of the light passing through the polarization modulator, can pass, and is constituted such that a spectral transmittance thereof can be switched electrically.

4. A photographing lens for a camera, comprising:

an optical filter unit that is disposed on an optical path of an object light that passes through the photographing lens, and can be switched to any one of a plurality of spectral transmittances;

a spectral transmittance switching unit that switches a spectral transmittance of the optical filter unit to one of the plurality of spectral transmittances;

a filter spectral transmittance information storage unit that stores filter spectral transmittance information, which is information relating to each of the plurality of spectral transmittances;

a lens spectral transmittance information storage unit that stores lens spectral transmittance information, which is information relating to a spectral transmittance of the photographing lens; and a lens information output unit that outputs lens information including the lens spectral transmittance information and the filter spectral transmittance information corresponding to the spectral transmittance of the optical filter unit to the camera to which the photographing lens is attached when the spectral transmittance of the optical filter unit is switched.

5. The photographing lens as defined in claim 4, wherein the lens information includes a plurality of filter spectral transmittance information corresponding to incident positions of the object light in an image field on an image forming plane of the photographing lens, the image field on the image forming plane of the photographing lens is divided into a plurality of areas, and the plurality of filter spectral transmittance information corresponds respectively to the plurality of divided areas.

6. The photographing lens as defined in claim 4, wherein the photographing lens is an interchangeable lens that can be attached to the camera detachably, and when the photographing lens is attached to the camera or when power is supplied to the camera after attaching the photographing lens to the camera, the information relating to the plurality of spectral transmittances that can be switched by the optical filter unit is output to the camera from the lens information output unit.

7. The photographing lens as defined in claim 4, wherein the photographing lens is a variable focal length lens being capable of varying focal length, and the lens information output unit is constituted to output the lens information when the focal length of the photographing lens is changed.

8. The photographing lens as defined in claim 4, wherein the optical filter unit includes at least one of an absorbing filter and an interference filter.

9. The photographing lens as defined in claim 4, wherein the optical filter unit comprises an electrically variable spectral characteristic filter having a polarizer that outputs input nonlinear polarized light as linear polarized light, a wavelength-selective polarization rotator that performs a wavelength-dependent polarization rotation action on the linear polarized light output from the polarizer, a polarization modulator that is capable of electrically modifying the polarization rotation action applied to the light passing through the wavelength-selective polarization modulator, and an analyzer through which only light having a predetermined polarization direction, of the light passing through the polarization modulator, can pass, and is constituted such that a spectral transmittance thereof can be switched electrically.

10. The photographing lens as defined in claim 4, wherein the optical filter unit is configured to be capable of disposing on any of a front surface, in the vicinity of a diaphragm, and a rear surface of the photographing lens.

11. A photographing lens for a camera, comprising:

an optical filter unit that is disposed on an optical path of an object light that passes through the photographing lens, and can be switched to any one of a plurality of spectral transmittances;

a spectral transmittance switching unit that switches a spectral transmittance of the optical filter unit to one of the plurality of spectral transmittances;

a lens total spectral transmittance information storage unit that stores lens total spectral transmittance information, which is information relating to a lens total spectral transmittance obtained by adding a spectral transmittance of the photographing lens to each of the plurality of spectral transmittances; and a lens information output unit that outputs lens information including the lens total spectral transmittance information corresponding to the spectral transmittance of the optical filter unit to the camera to which the photographing lens is attached when the spectral transmittance of the optical filter unit is switched.

12. The photographing lens as defined in claim 11, wherein the lens information includes a plurality of lens total spectral transmittance information corresponding to incident positions of the object light in an image field on an image forming plane of the photographing lens, the image field on the image forming plane of the photographing lens is divided into a plurality of areas, and the plurality of lens total spectral transmittance information corresponds respectively to the plurality of divided areas.

13. A lens-replaceable camera to which the photographing lens as defined in claim 4 may be attached detachably, comprising:

a lens information input unit that inputs the lens information output from the lens information output unit;

an image pickup unit capable of generating an image signal having at least three bands from an object image formed by the photographing lens;

an image data processing unit that generates image data by processing the image signal generated by the image pickup unit; and a spectral transmittance switch command signal output unit that outputs a signal specifying one of the plurality of spectral transmittances that can be switched by the optical filter unit to the photographing lens, wherein the image data processing unit generates image data having a larger number of bands than a number of bands included in an image signal generated by the image pickup unit in a single image pickup operation on the basis of a plurality of the image signals having at least three bands, which are obtained by the image pickup unit through image pickup operations performed every time the spectral transmittance of the optical filter unit is switched, and the filter spectral transmittance information and lens spectral transmittance information, or the lens total spectral transmittance information, included in the lens information input from the photographing lens.

14. The lens-replaceable camera as defined in claim 13, further comprising a filter spectral transmittance setting unit that allows a user of the camera to set the spectral transmittance of the optical filter unit to be employed during an image pickup operation prior to the image pickup operation.

15. The lens-replaceable camera as defined in claim 14, further comprising an image pickup completion time setting unit that sets a time from the start of a first image pickup operation to the end of a final image pickup operation during a series of image pickup operations in which image pickup is performed a plurality of times while switching the spectral transmittance of the optical filter unit.

16. A camera having the photographing lens as defined in claim 4, comprising:

a lens information input unit that inputs the lens information output from the lens information output unit;

an image pickup unit capable of generating an image signal having at least three bands from an object image formed by the photographing lens;

an image data processing unit that generates image data by processing the image signal generated by the image pickup unit; and a spectral transmittance switch command signal output unit that outputs a signal specifying one of the plurality of spectral transmittances that can be switched by the optical filter unit to the photographing lens, wherein the image data processing unit generates image data having a larger number of bands than a number of bands included in an image signal generated by the image pickup unit in a single image pickup operation on the basis of a plurality of the image signals having at least three bands, which are obtained by the image pickup unit through image pickup operations performed every time the spectral transmittance of the optical filter unit is switched, and the filter spectral transmittance information and lens spectral transmittance information, or the lens total spectral transmittance information, included in the lens information input from the photographing lens.

17. The camera as defined in claim 16, further comprising a filter spectral transmittance setting unit that allows a user of the camera to set the spectral transmittance of the optical filter unit to be employed during an image pickup operation prior to the image pickup operation.

18. The camera as defined in claim 17, further comprising an image pickup required time setting unit that sets a time from the start of a first image pickup operation to the end of a final image pickup operation during a series of image pickup operations in which image pickup is performed a plurality of times while switching the spectral transmittance of the optical filter unit.

* * * * *